US012375256B1

(12) United States Patent
Shrikhande et al.

(10) Patent No.: US 12,375,256 B1
(45) Date of Patent: Jul. 29, 2025

(54) TIME AWARE LINK-LEVEL TELEMETRY

(71) Applicant: Marvell Asia Pte Ltd, Singapore (SG)

(72) Inventors: Kapil Vishwas Shrikhande, Berkeley, CA (US); Puneet Agarwal, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 461 days.

(21) Appl. No.: 17/976,671

(22) Filed: Oct. 28, 2022

Related U.S. Application Data

(60) Provisional application No. 63/358,957, filed on Jul. 7, 2022.

(51) Int. Cl.
*H04L 7/00* (2006.01)
*H04L 1/00* (2006.01)
*H04J 3/06* (2006.01)

(52) U.S. Cl.
CPC ............ *H04L 7/0016* (2013.01); *H04L 1/004* (2013.01); *H04J 3/0697* (2013.01)

(58) Field of Classification Search
None
See application file for complete search history.

(56) References Cited

U.S. PATENT DOCUMENTS

| 9,479,428 | B2 | 10/2016 | Banerjea et al. |
| 9,900,088 | B2 | 2/2018 | Rope |
| 10,673,727 | B2 | 6/2020 | Mizrahi |
| 11,075,847 | B1 | 7/2021 | Kwan et al. |
| 11,438,211 | B1 | 9/2022 | Lyubomirsky et al. |

OTHER PUBLICATIONS

"In-Band Network Telemetry (INT) Dataplane Specification," v. 2.1, The P4.org Applications Working Group, 56 pages (Nov. 11, 2020).

*Primary Examiner* — Abdelillah Elmejjarmi

(57) ABSTRACT

A network devices includes multiple components including respective clocks that are synchronized with a global time. Each component includes one or more sensors and/or error detection circuitry that generate telemetry data. Each component associates the telemetry data with the global time, which enables time-correlation of telemetry data from the different components within the network device and/or from other network devices that also generate telemetry data associated with the global time.

26 Claims, 10 Drawing Sheets

FIG. 5A

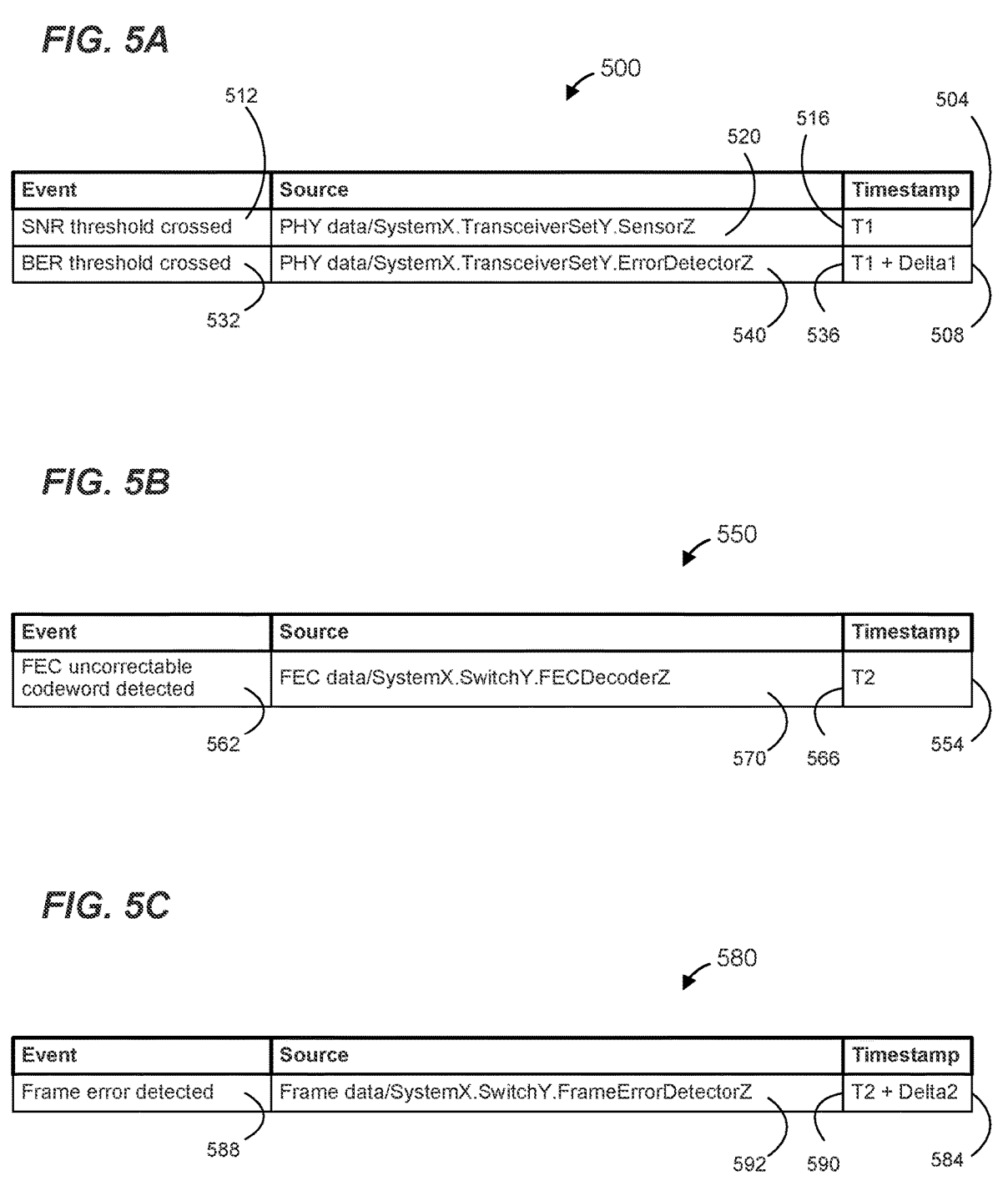

| Event | Source | Timestamp |
|---|---|---|
| SNR threshold crossed | PHY data/SystemX.TransceiverSetY.SensorZ | T1 |
| BER threshold crossed | PHY data/SystemX.TransceiverSetY.ErrorDetectorZ | T1 + Delta1 |

FIG. 5B

| Event | Source | Timestamp |
|---|---|---|
| FEC uncorrectable codeword detected | FEC data/SystemX.SwitchY.FECDecoderZ | T2 |

FIG. 5C

| Event | Source | Timestamp |
|---|---|---|
| Frame error detected | Frame data/SystemX.SwitchY.FrameErrorDetectorZ | T2 + Delta2 |

| Event | Source | Timestamp |
|---|---|---|
| SNR threshold crossed | PHY data/SystemX.TransceiverSetY.SensorZ | T1 |
| BER threshold crossed | PHY data/SystemX.TransceiverSetY.ErrorDetectorZ | T1 + Delta1 |
| FEC uncorrectable codeword detected | FEC data/SystemX.SwitchY.FECDecoderZ | T2 |
| Frame error detected | Frame data/SystemX.SwitchY.FrameErrorDetectorZ | T2 + Delta2 |

| Source | Time Interval | Data0 | Data1 | ... |
|---|---|---|---|---|
| PHY data/SystemX.TransceiverSetY.SensorZ | T0 to T1 | Sensor Data | Sensor Data | ... |
| FEC data/SystemX.SwitchY.FECDecoderZ | T0 to T1 | ED Data | ED Data | ... |

| Source | Time Interval | Data0 | Data1 | ... |
|---|---|---|---|---|
| PHY data/SystemX.TransceiverSetY.SensorZ | T1 to T2 | Sensor Data | Sensor Data | ... |
| FEC data/SystemX.SwitchY.FECDecoderZ | T1 to T2 | ED Data | ED Data | ... |

708
758

US 12,375,256 B1

TIME AWARE LINK-LEVEL TELEMETRY

CROSS REFERENCES TO RELATED APPLICATIONS

This application claims the benefit of U.S. Provisional Patent App. No. 63/358,957, entitled "Time Aware Link-Level Telemetry," filed on Jul. 7, 2022, the disclosure of which is expressly incorporated herein by reference in its entirety.

FIELD OF TECHNOLOGY

The present disclosure relates generally to communication networks, and more particularly to collecting link-level performance information in a network device.

BACKGROUND

As a signal travels on a communication link between network devices, the signal will degrade due to noise, interference, channel impairments, impairments caused by intermediate devices, etc. Signal degradation leads to bit errors, which may lead to uncorrectable forward error correction (FEC) codeword errors, which may lead to Ethernet frame and/or packet errors.

Generally, performance of a communication link is assessed by determining a reliability of the communication link for correctly conveying information. Performance can be measured at different layers: a physical layer, an FEC layer, and a frame layer, for example. Physical layer metrics such as a signal-to-noise ratio (SNR) provide an indirect measure of link performance. For example, fewer bit errors will occur when a link has high SNR, whereas more bit errors will occur when the link has low SNR. FEC layer metrics such as bit error rate and uncorrectable codeword rate provide a direct measure of how well the communication link transfers bits. Frame layer metrics such as frame/packet error rate provide a direct measure of how well the communication link transfers communication frames such as Ethernet frames and packets.

A data center network typically includes numerous communication links. Data center networks are currently growing at an exponential pace and thus the number of communication links within data centers is also growing rapidly. With the increasing number of communication links in a data center, the probability of communication link problems is also increasing. When performance of a communication link becomes poor and/or the communication link fails, this may cause unplanned service disruptions and/or may burden other parts of the data center network. Thus, a data center operator will seek to determine a cause of the link failure/poor link performance quickly in order to recover the communication link and restore the overall availability and performance of the data center. Ideally, the data center operator seeks to identify causes of link performance degradation before performance of a communication link becomes poor or fails altogether.

SUMMARY

In an embodiment, a method for collecting sensor data and error detection data in a network device includes: synchronizing a first clock associated with one or more transceivers of the network device with a global time of a communication network that includes the network device, wherein the global time is maintained externally to the network device; synchronizing a second clock associated with a network switch of the network device with the global time, wherein the network switch is communicatively coupled to the one or more transceivers and is configured to process packets received by the one or more transceivers; generating, with a sensor corresponding to the one or more transceivers, raw sensor data that measures a characteristic of at least one of i) an integrated circuit (IC) chip corresponding to the one or more transceivers, and ii) an electrical or optical signal corresponding to the one or more transceivers; associating, by the network device, sensor information corresponding to the raw sensor data with first time information measured by the first clock; generating, with an error detector corresponding to the network switch, raw error detection data corresponding to one or more packets received by the network switch via the one or more transceivers; associating, by network device, error detection information corresponding to the raw error detection data with second time information measured by the second clock; providing to a host processor, by first data collection circuitry corresponding to the one or more transceivers, i) the sensor information and ii) the first time information measured by the first clock; and providing to the host processor, by second data collection circuitry of the network switch, i) the error detection information and ii) the second time information measured by the second clock, wherein the first time information synchronized with the global time and the second time information synchronized with the global time are configured to facilitate the host processor correlating the sensor information and the error detection information according to the global time of the communication network.

In another embodiment, a network device comprises a physical layer (PHY) processor. The PHY processor includes: one or more transceivers configured to couple to respective network links external to the network device; a first clock configured to synchronize with a global time of a communication network that includes the network device, wherein the global time is maintained externally to the network device; a sensor configured to generate raw sensor data that measures a characteristic of at least one of i) an integrated circuit (IC) chip corresponding to the PHY processor, and ii) an electrical or optical signal corresponding to the PHY processor; and first data collection circuitry that is configured to provide to a host processor, i) sensor information corresponding to raw sensor data generated by the sensor, and ii) first time information measured by the first clock, the first time information associated with the sensor information. The network device also comprises a network switch coupled to the PHY processor. The network switch is configured to analyze at least headers of packets received by the network switch via network links external to the network device, and to determine network links via which the packets are to be forwarded. The network switch includes: a second clock configured to synchronize with the global time; error detector circuitry configured to generate raw error detection data corresponding to packets processed by the network switch; and second data collection circuitry that is configured to provide to the host processor, i) error detection information corresponding to the raw error detection data generated by the error detection circuitry, and ii) second time information measured by the second clock, the second time information associated with the error detection information. The first time information synchronized with the global time and the second time information synchronized with the global time are configured to facilitate the host processor correlating the sensor information and the error detection information according to the global time of the communication network.

BRIEF DESCRIPTION OF THE DRAWINGS

FIGS. 5A-C are diagrams of example data structures that the network device of FIG. 1 is configured to generate, according to an embodiment.

FIG. 6 is a diagram of an example data structure that a host processor is configured to generate using data from the data structures of FIGS. 5A-C, according to an embodiment.

FIGS. 8A-B are diagrams of example data structures that a host processor is configured to generate using data from the data structures of FIGS. 7A-B, according to an embodiment.

DETAILED DESCRIPTION

Figure 1:
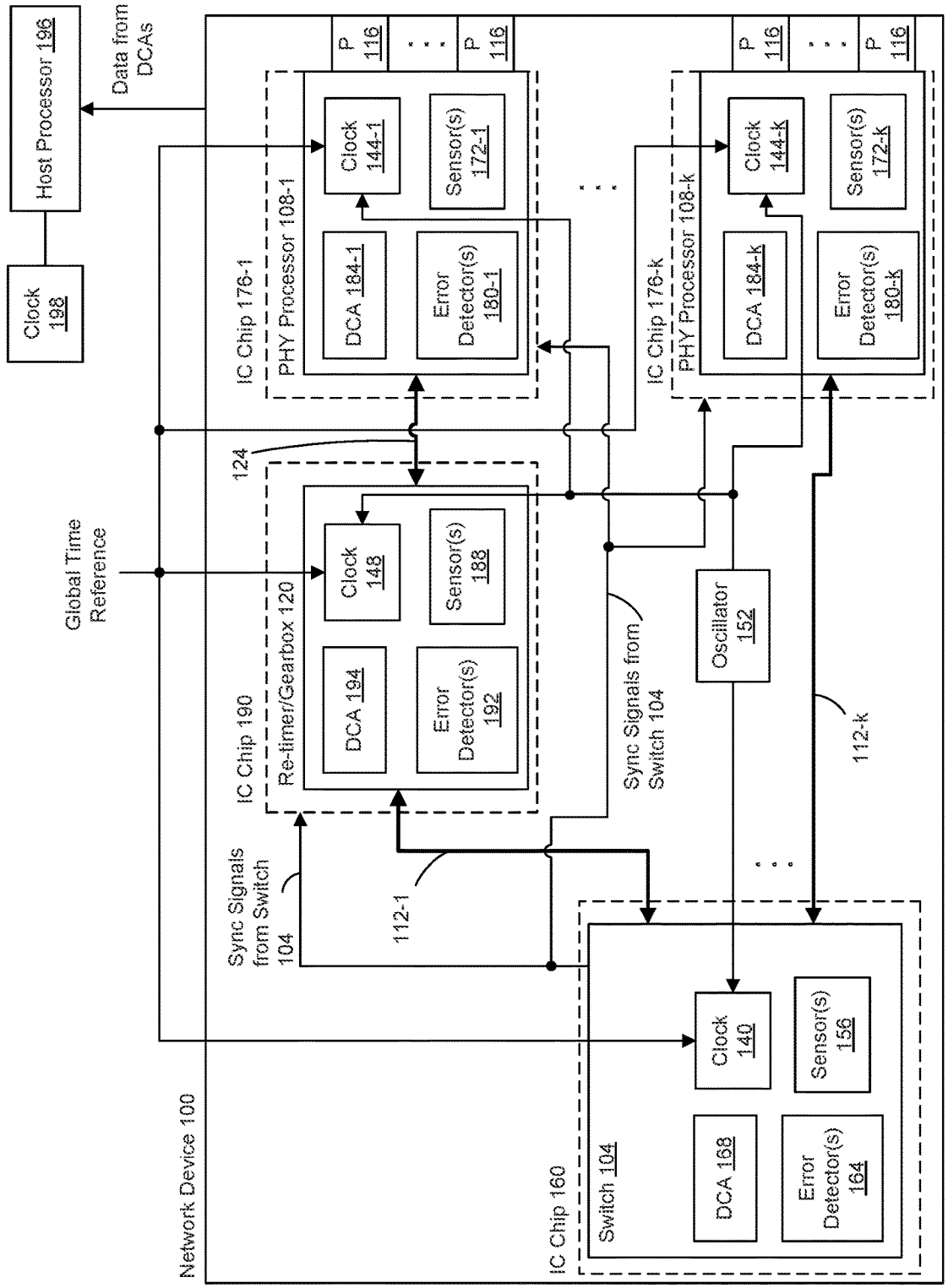
FIG. 1 is a simplified block diagram of an example network device that is configured to generate telemetry data and associated time information that enables time-correlation of telemetry data from different components of the network device and/or from other network devices, according to an embodiment.

Typical communication networks have link-level performance monitors that monitor network links independently and that associate performance measurements with disparate and unsynchronized time sources. Moreover, to the extent that typical communication networks associate performance measurements with time sources, such time sources typically have low precision as compared to the precision needed for identifying sources of poor performance. As an example, short reductions in signal quality that last only several nanoseconds can cause multiple bit errors leading possibly to frame/packet errors. For instance, a 64 byte frame transmitted at 400 Gigabits per second (Gb) Ethernet has a duration of only 1.28 ns. As another example, a typical forward error correction (FEC) codeword transmitted at 800 Gb Ethernet has a duration of about 12 ns.

Additionally, because the performance monitors discussed above associate performance measurements with unsynchronized time sources, it is difficult to difficult to identify that different performance-related events detected by different performance monitors may be related. For example, because of the unsynchronized time sources, it is difficult to difficult to identify that different performance-related events detected by different performance monitors are time-correlated and/or determine an ordering of the events in time.

Some current systems use a host central processing unit (CPU) that is coupled to one or more network devices to collect telemetry data from measurement modules in one or more network devices. In such systems, the CPU controls the start and stop of collection by measurement modules in one or more network devices based on a clock of the CPU. However, the CPU cannot reliably start and stop such collection of telemetry data with high time precision. For example, the clocks used by CPUs typically do not have high precision. Additionally, CPUs are often interrupted regularly to perform other time critical tasks. Further, different measurement modules at different distances from the CPU will result in different time lags in the receipt of control signals by the different measurement modules. Also, there may be other causes of unknown and/or variable time lags in signals between the CPU and the different measurement modules.

In embodiments described below, network devices are configured to generate telemetry data and associate the telemetry data with a global time reference, which enables time-correlation of telemetry data from different components of a single network device and/or from different network devices. In some embodiments, such telemetry data is generated in association with time measured with high precision, e.g., on the order of nanoseconds or fractions of nanoseconds.

With the growing size of communication networks, embodiments of networks devices described herein are useful for operators of communication networks, such as data center networks, to track the health of network links over time and to know when performance related events have occurred in different components of the network and/or to measure performance-related metrics at specific times in different components of the network.

At least in some embodiments of network devices describe herein, telemetry data generated by such network devices enable operators to query and/or measure link-level performance at specific times and/or over specific time intervals. Additionally, telemetry data generated by such network devices enable the correlation of telemetry data across different components within a single network device and/or across different network devices and to create rich data sets for further analysis, identify patterns across different links in a network, isolate errors to particular parts of a network link, identify causes-and-effects between link level events and quality of service issues experienced by a customer, etc., according to various embodiments.

Further, telemetry data generated by such network devices enable operators to query and/or measure link-level performance at specific times and/or over specific time intervals at high precision in terms of time.

FIG. 1 is a simplified diagram of an example network device 100 that is used in a communication network, according to an embodiment. In some embodiments, the network device 100 is included within a communication network of a data center. In other embodiments, the network device 100 is included in another suitable communication network.

The network device 100 includes a network switch 104 coupled to a plurality of transceiver sets 108 via internal communication links 112. The transceiver sets 108 are coupled to a plurality of ports 116. Each of at least some of the ports 116 is configured to couple to an external network link comprising a suitable communication medium, such as a copper cable, an optical fiber, etc. The network device 100 receives and transmits packets via the ports 116.

The network switch 104 is configured to analyze at least headers of packets received by the network switch 104 to determine ports 116 of the network device 100 to which the packets are to be forwarded.

Each transceiver set 108 comprises one or more transceivers (not shown in FIG. 1). Each transceiver set 108 is configured to perform physical layer (PHY) protocol operations with respect to packets that are received via the communication links 112 and that are to be transmitted via the communication links 112, in an embodiment. The transceiver sets 108 are sometimes referred to herein as PHY processors 108.

Each transceiver of the PHY processor 108 is coupled to a respective port 116 and is configured to transmit and receive signals via the respective port 116. Each transceiver is configured to receive packets from the network switch 104 via the respective internal communication link 112, and to transmit the packets via the respective port 116. Additionally, each transceiver is configured to receive packets from the respective port 116, and to transmit the packets to the network switch 104 via the respective internal communication link 112.

In some embodiments in which a PHY processor 108 is located at a relatively long distance from the network switch 104 and/or in which the corresponding internal communication link 112 consists of a first number of lanes whereas the PHY processor 108 is not capable of coupling to the first number of lanes (e.g., the transceiver set is configured to couple to a second number of lanes that is different from the first number of lanes), re-timer circuitry and/or gearbox circuitry 120 (sometimes referred to herein as "the re-timer/gearbox 120") is employed to communicatively couple the PHY processor 108 to the network switch 104. In the embodiment of FIG. 1, for example, the PHY processor 108-1 is communicatively coupled to the network switch 104 via the re-timer/gearbox 120. In particular, the re-timer/gearbox 120 is coupled to the network switch 104 via the communication link 112-1, and the re-timer/gearbox 120 is coupled to the PHY processor 108-1 via an internal communication link 124.

Re-timer circuitry is useful when the PHY processor 108 is located at a relatively long distance from the network switch 104. Re-timer circuitry is configured to receive a signal, extract data from the signal, regenerate the signal using the extracted data, and then retransmit the regenerated signal.

Gearbox circuitry is useful for interfacing between a first communication link consisting of a first number of lanes, each operating at a first data rate, and a second communication link consisting of a second number of lanes that is different from the first number of lanes, and each operating at a second data rate that his different than the first data rate. Gearbox circuitry is configured to receive a first signal via a first number of lanes (each operating at a first data rate), extract data from the first signal, generate a second signal using the extracted data, the second signal configured for transmission via a second number of lanes, and then transmit the second signal via the second number of lanes (each operating at a second data rate).

Although one re-timer/gearbox 120 is illustrated in FIG. 1, the network device 100 includes more than one re-timer/gearbox 120 in other embodiments. In some embodiments, the re-timer/gearbox 120 is omitted.

The network switch 104, the transceiver sets 108, and the re-timer/gearbox 120 include respective clocks. For example, the network switch 104 includes a clock 140; the transceiver sets 108 include respective clocks 144; and the re-timer/gearbox 120 includes a clock 148. The clocks 140/144/148 are synchronized with one another, i.e., differences between the times maintained by the clocks 140/144/148 remain within a suitable defined margin of error. In an embodiment, one of the clocks 140/144/148 maintains a local time, and the clocks 140/144/148 are synchronized to the local time. For example, the clock 140 maintains the local time, and the clocks 144/148 are synchronized to the clock 140, according to an embodiment.

In some embodiments, the clocks 140/144/148 are also synchronized to a global time, i.e., respective differences between the times maintained by the clocks 140/144/148 and the global time remain within a suitable defined margin of error. As used herein, the term "global time" refers to a time reference that is maintained externally to the network device 100 and that is used by multiple other network devices within a communication network that also includes the network device 100. For example, the same global time is used across multiple network devices in a data center, according to an illustrative embodiment. In an embodiment, one of the clocks 140/144/148 maintains a local time that is synchronized with the global time. For example, the clock 140 is synchronized to the global time, and the clocks 144/148 are synchronized to the clock 140, according to an embodiment.

The clocks 140/144/148 are incremented based on an output of a same oscillator 152 and thus are frequency synchronized, according to an embodiment. In other embodiments, two or more of the clocks 140/144/148 are incremented based on respective outputs of respective different oscillators. Synchronization of the clocks 140/144/148 is discussed in more detail below. Although the oscillator 152 is illustrated in FIG. 1 as being separate from the network switch 104, the transceiver sets 108, and the re-timer/gearbox 120, the oscillator 152 is included in one of the network switch 104, the transceiver sets 108, or the re-timer/gearbox 120, in other embodiments. For example, the oscillator 152 is included in the network switch 104, in an embodiment.

The network switch 104 includes one or more sensors 156 that are configured to monitor one or more physical characteristics of at least one of i) a respective integrated circuit (IC) chip corresponding to the network switch 104, and ii) an electrical signal corresponding to the network switch 104. For example, the network switch 104 is implemented at least partially on an IC chip 160 and a temperature sensor 156 is configured to measure a temperature of the IC chip 160, according to an embodiment. As another example, a power supply sensor 156 is configured to measure one or more physical characteristics (e.g., a voltage level) of a power supply signal of the network switch 104, according to an embodiment. As yet another example, a signal sensor 156 is configured to measure one or more physical characteristics (e.g., a signal-to-noise ratio (SNR), a signal-to-interference-plus-noise ratio (SINR), a voltage amplitude, a power level, etc.) of a signal on a communication link 112, according to an embodiment. In some embodiments, the network switch 104 includes none of, one of, or any suitable combination of two or more of i) a temperature sensor 156, ii) a power supply voltage sensor 156, and iii) a respective sensor 156 for each of at least some of the communication links 112.

In some embodiments, a sensor 156 is configured to detect events corresponding to a physical characteristic being measured by the sensor 156, and to generate indicators of the events. For example, the sensor 156 is configured to detect when a sensor output signal generated by the sensor 156 (e.g., a measured temperature signal, a measured SNR signal, a measured SINR signal, a measured voltage amplitude signal, a measured power level signal, etc.) goes above a first threshold, falls below a second threshold, etc., and to generate an indicator that the sensor output signal went above the first threshold, fell below the second threshold, etc., according to an embodiment.

In some embodiments, one or more sensors 156 are coupled to the clock 140 and are configured to determine times, as measured by the clock 140, corresponding to the measurements made by the sensor 156. In some embodiments, one or more sensors 156 are configured to associate respective determined times, as measured by the clock 140, with measurements made by the one or more sensors 156. A determined time of a measurement is sometimes referred to herein as a "timestamp" of the measurement. In other embodiments, one or more sensors 156 are not configured to generate timestamps of measurements.

In some embodiments, one or more sensors 156 are coupled to the clock 140 and are configured to determine times, as measured by the clock 140, corresponding to the events detected by the one or more sensors 156. In some embodiments, one or more sensors 156 are configured to generate the indicators of events to include respective determined times, as measured by the clock 140, of the events. A determined time of an event is sometimes referred to herein as a "timestamp" of the event. In other embodiments, one or more sensors 156 are not configured to generate timestamps of events.

The network switch 104 also includes one or more error detectors 164 configured to generate error detection information corresponding to packets processed by the network switch 104. For example, the network switch 104 includes a bit error detector 164 (e.g., a parity-based error detector, a cyclic redundancy check (CRC) error detector, a bit error detector within a Viterbi decoder, or another suitable bit error detector) that is configured to generate an indicator of a number of bit errors detected by the bit error detector 164 during a time interval, in a frame received by the network switch 104 via a communication link 112, etc., according to some embodiments. The bit error detector 164 is also configured to generate a rate at which the bit error detector 164 detects errors in bits received by the network switch 104, according to an embodiment.

As another example, the network switch 104 includes a forward error correction (FEC) decoder that is configured to generate an indicator of a number of bit errors detected by the FEC decoder (e.g., a Viterbi decoder, a Reed-Solomon (RS) decoder, a low density parity check (LDPC) decoder, etc.) in an FEC codeword received by the network switch 104 via a communication link 112, according to an embodiment. The FEC decoder is also configured to generate a rate at which the FEC decoder is unable to decode FEC codewords (e.g., the number of bit errors in the FEC codeword is too high for the FEC decoder to correctly decode the FEC codeword) received by the network switch 104 via a communication link 112, according to an embodiment. A codeword that cannot be correctly decoded by the FEC decoder is sometimes referred to herein as an "uncorrectable FEC codeword".

As yet another example, the network switch 104 includes a frame error detector 164 that is configured to generate i) an indicator of a number of frame errors in frames and/or ii) an indicator of a rate of frame errors in frames received by the network switch 104 via a communication link 112, according to an embodiment. In some scenarios, a frame includes one or more FEC codewords, and at least one uncorrectable FEC codeword in the frame results in a frame error. In other scenarios, a single FEC codeword spans multiple frames, and an uncorrectable FEC codeword results in multiple frame errors. In some embodiments, the frame error detector comprises a bit error detector (e.g., a cyclic redundancy check (CRC) error detector or another suitable bit error detector) that is configured to generate an indicator of at least one bit error in a frame received by the network switch 104 via a communication link 112. In an embodiment, when the bit error detector detects at least one bit error in a frame after an FEC decoder processes one or more codewords corresponding to the frame (i.e., the FEC decoder was unable to correct one or more errors in the one or more codewords), a frame error is detected.

In some embodiments, the error detector 164 is coupled to the clock 140 and is configured to determine timestamps, as measured by the clock 140, corresponding to errors detected by the error detector 164, time intervals of bit error measurements made by the error detector 164, etc. In some embodiments, the error detector 164 is configured to associate respective timestamps, as measured by the clock 140, with error measurements made by the error detector 164. In other embodiments, the error detector 164 is not configured to associate respective timestamps, as measured by the clock 140, with error measurements made by the error detector 164.

In some embodiments, an error detector 164 is configured to detect events corresponding to errors detected by the error detector 164, and to generate indicators of the events. For example, the error detector 164 is configured to detect when an error rate measured by the error detector 164 (e.g., a bit error rate, an uncorrectable codeword rate, a frame error rate, etc.) goes above a first threshold, falls below a second threshold, etc., and to generate an indicator that the error rate went above the first threshold, fell below the second threshold, etc., according to an embodiment. As another example, the error detector 164 is configured to detect when an error is detected (e.g., an uncorrectable codeword is detected, a frame error is detected, etc.), and to generate an indicator that the error was detected, according to an embodiment.

In some embodiments, the error detector 164 is coupled to the clock 140 and is configured to determine timestamps, as measured by the clock 140, corresponding to the events detected by the error detector 164. In some embodiments, the error detector 164 is configured to generate the indicators of events to include respective timestamps, as measured by the clock 140, of the events. In other embodiments, one or more error detectors 164 are not configured to generate timestamps of the events.

The network switch 104 also includes a data collection agent (DCA) 168 that is configured to collect i) raw error detection data from the error detector(s) 164 and ii) raw time data measured by the clock 140 that indicates times corresponding to the raw error detection data collected by the DCA 168. The DCA 168 is also configured to generate i) error detection information that corresponds to the raw error detection data and ii) time information corresponding to the raw time data.

Generating error detection information that corresponds to raw error detection data includes sampling the raw error detection data, i.e., the error detection information includes samples of raw error detection data, according to an embodiment. In some such embodiments, generating the time information corresponding to the raw time data includes generating the time information to include respective timestamps corresponding to the sampled raw error detection data. In some embodiments, the error detector 164 provides timestamps, as measured by the clock 140, corresponding to raw error detection data. In other embodiments, the DCA 168 is configured to generate timestamps, as measured by the clock 140, corresponding to raw error detection data received from the error detector 164.

Sampling raw error detection data comprises sampling error detection data that is continuously updated, according to some embodiments. For example, the error detector 164 continuously generates an error rate (e.g., a bit error rate, a rate of uncorrectable codewords, a frame error rate, etc.), and sampling the raw error detection data comprises sampling the error rate at a particular time as measured by the clock 140, according to an embodiment.

As another example, the error detector 164 repeatedly generates a count of errors (e.g., a count of bit errors, a count of uncorrectable codewords, a count of frame errors, etc.) over a defined time interval as measured by the clock 140, and sampling the raw error detection data comprises sampling the count of errors for a particular time interval, according to an embodiment. As another example, the error detector 164 repeatedly generates a count of errors (e.g., a count of bit errors, a count of uncorrectable codewords, a count of frame errors, etc.) using a counter, and sampling the raw error detection data at a time t1 comprises sampling a first count of errors at time t1, according to an embodiment.

Sampling raw error detection data comprises sampling a set of error detection data over a defined time period as measured by the clock 140, according to some embodiments. For example, the error detector 164 continuously generates an error rate (e.g., a bit error rate, a rate of uncorrectable codewords, a frame error rate, etc.), and sampling the raw error detection data comprises sampling a set of error rate values over a defined time period as measured by the clock 140, according to an embodiment. As another example, the DCA 168 counts errors detected by the error detector 164 (e.g., bit errors, uncorrectable codewords, frame errors, etc.) over a defined time interval as measured by the clock 140, and sampling the raw error detection data comprises determining the count of errors over a defined time period as measured by the clock 140, according to an embodiment. In some such embodiments, generating the time information corresponding to the raw time data includes generating the time information to indicate a particular time interval over which the raw error detection data was counted (e.g., a start time and an end time; a start time and a duration of the time interval; an end time and a duration of the time interval; a center time and a duration of the time interval; etc.).

Generating error detection information that corresponds to raw error detection data additionally or alternatively includes filtering the raw error detection data to generate filtered error detection data, according to an embodiment. Filtering the raw error detection data includes generating an average of the raw error detection data (e.g., a moving average, a weighted moving average, etc.), applying a finite impulse response (FIR) filter to the raw error detection data, applying an infinite impulse response (IIR) filter to the raw error detection data, etc. In some such embodiments, generating the time information corresponding to the raw time data includes generating the time information to indicate a particular time interval over which the raw error detection data was filtered (e.g., a start time and an end time; a start time and a duration of the time interval; an end time and a duration of the time interval; a center time and a duration of the time interval; etc.). In other such embodiments, generating the time information corresponding to the raw time data includes generating the time information to indicate a time corresponding to the particular time interval over which the raw error detection data was filtered (e.g., a start time of the interval; an end time of the interval; a center time of the interval; etc.).

When the network switch 104 includes sensor(s) 156, the DCA 168 is also configured to collect i) raw sensor data from the sensor(s) 156 and ii) raw time data measured by the clock 140 that indicates times corresponding to the raw sensor data collected by the DCA 168. The DCA 168 is also configured to i) generate sensor information that corresponds to the raw sensor data and ii) time information corresponding to the raw time data.

Generating sensor information that corresponds to raw sensor data includes sampling the sensor data, i.e., the sensor information includes samples of raw sensor data, according to an embodiment. In some such embodiments, generating the time information corresponding to the raw time data includes generating the time information to include respective timestamps corresponding to the sampled raw sensor data. In some embodiments, the sensor 168 provides timestamps, as measured by the clock 140, corresponding to raw sensor data. In other embodiments, the DCA 168 is configured to generate timestamps, as measured by the clock 140, corresponding to raw sensor data received from the sensor 168.

Sampling raw sensor data comprises sampling a set of sensor data over a defined time period as measured by the clock 140, according to some embodiments. For example, the sensor 168 continuously generates an output (e.g., a signal voltage level, a signal power level, an SNR, an SINR, etc.), and sampling the raw sensor data comprises sampling a set of output signal values over a defined time period as measured by the clock 140, according to an embodiment. In some such embodiments, generating the time information corresponding to the raw time data includes generating the time information to indicate a particular time interval over which the raw sensor data was collected (e.g., a start time and an end time; a start time and a duration of the time interval; an end time and a duration of the time interval; a center time and a duration of the time interval; etc.).

Generating sensor information that corresponds to raw sensor data additionally or alternatively includes filtering the raw sensor data to generate filtered sensor data, according to an embodiment. Filtering the raw sensor data includes generating an average of the raw sensor data (e.g., a moving average, a weighted moving average, etc.), applying a FIR filter to the raw sensor data, applying an IIR filter to the raw sensor data, etc. In some such embodiments, generating the time information corresponding to the raw time data includes generating the time information to indicate a particular time interval over which the raw sensor data was filtered (e.g., a start time and an end time; a start time and a duration of the time interval; an end time and a duration of the time interval; a center time and a duration of the time interval; etc.). In other such embodiments, generating the time information corresponding to the raw time data includes generating the time information to indicate a time corresponding to the particular time interval over which the raw sensor data was filtered (e.g., a start time of the interval; an end time of the interval; a center time of the interval; etc.).

In some embodiments, the DCA 168 is configured to collect data from an error detector 164/sensor 156 for a time interval as measured by the clock 140. For example, in some embodiments, the DCA 168 uses the clock 140 to collect raw data from an error detector 164/sensor 156 for a time interval as measured by the clock 140. As another example, the DCA 168 configures the error detector 164/sensor 156 to collect raw data for a particular time interval, and the error detector 164/sensor 156 uses the clock 140 to collect raw data for the particular time interval as measured by the clock 140; then the DCA 168 retrieves the raw data for the particular time interval from the error detector 164/sensor 156.

In some embodiments, the DCA 168 is configured to collect data from one error detector 164/sensor 156 in response to an event detected by another error detector 164/sensor 156. As an illustrative example, in response to an output of a sensor 156 meeting a threshold (e.g., an IC temperature meeting a threshold, an SNR corresponding to a communication link 112 meeting a threshold, a power supply voltage level falling below a threshold, etc.), the DCA 168 collects error detection data from an error detector 164 (e.g., a count of bit errors over a time interval, a bit error rate, a count of uncorrectable codewords over the time interval, a rate of uncorrectable codewords, a count of frame errors over the time interval, a rate of frame errors, etc.), according to an embodiment. As another illustrative example, in response to an output of an error detector 164 meeting a threshold (e.g., a count of bit errors over a time interval meeting a threshold, a bit error rate meeting a threshold, a count of uncorrectable codewords over the time interval meeting a threshold, a rate of uncorrectable codewords meeting a threshold, a count of frame errors over the time interval meeting a threshold, a rate of frame errors meeting a threshold, etc.), the DCA 168 collects sensor data from a sensor 156 (e.g., an IC temperature, values of the IC temperature of a time interval, an SNR, values of the SNR over a time interval, a power supply voltage level, values of the power supply voltage level over a time interval, etc.), according to an embodiment.

In some embodiments, generating sensor/error detection information that corresponds to raw sensor/error detection data includes generating a performance metric information (such as a figure of merit (FOM) information or other suitable performance metric information) using raw sensor/error detection data, and the DCA 168 is configured to generate performance metric information using raw sensor data and/or raw error detection data from one or more error detectors 164/sensors 156. Generating performance metric information includes generating a metric that indicates a performance level of the switch 104 or of a communication path within the network device 100 that is coupled to the switch 104 as a mathematical combination of values from multiple error detectors 164 and/or sensors 156, according to some embodiments. In some embodiments, the DCA 168 is configured to generate timestamps, as measured by the clock 140, corresponding to performance metric information generated by the DCA 168. In some embodiments, the DCA 168 is configured to record performance metric information during a time interval measured by the clock 140. When the performance metric information is generated using sensor data, the performance metric information may be considered sensor information. When the performance metric information is generated using error detection data, the performance metric information may be considered error detection information. When the performance metric information is generated using sensor data and error detection data, the performance metric information may be considered both sensor information and error detection information.

In some embodiments, generating sensor/error detection information that corresponds to raw sensor/error detection data includes generating indicators of events corresponding to raw sensor/error detection data. In various embodiments, generating indicators of events comprises one of, or any suitable combination of two or more of: generating an indicator that raw sensor/error detection data has exceeded a threshold (e.g., a bit error rate has exceeded a threshold, a temperature has exceeded a threshold, etc.); generating an indicator that raw sensor/error detection data has fallen below a threshold (e.g., SNR has fallen below a threshold, a power supply voltage level has fallen below a threshold, etc.); generating an indicator that filtered sensor/error detection information has exceeded a threshold (e.g., an average bit error rate has exceeded a threshold, an average temperature has exceeded a threshold, a power supply voltage ripple amplitude has exceeded a threshold, etc.); generating an indicator that filtered sensor/error detection information has fallen below a threshold (e.g., an average SNR has fallen below a threshold, an average power supply voltage level has fallen below a threshold, etc.); generating an indicator that an error is detected (e.g., an uncorrectable codeword is detected, a frame error is detected, etc.), etc.

In some embodiments, the DCA 168 is configured to collect data from one or more error detectors 164/sensors 156 in response to an event corresponding to a performance metric calculated by the DCA 168, e.g., a value of the performance metric falling below a threshold, exceeding the threshold, etc.

In some embodiments, the DCA 168 includes one or more counters for counting one or more of i) bit errors detected by a bit error detector, ii) uncorrectable codewords detected by an FEC decoder, iii) frame errors detected by a frame error detector, etc. In some embodiments, the DCA 168 additionally or alternatively includes one or more counters for counting one or more other events detected by the sensors and/or error detectors.

In some embodiments, the DCA 168 is configured to use the clock 140 to collect data from one or more sensors/error detectors. As an illustrative example, the DCA 168 is configured to record a value of the counter at time to as measured by the clock 140, record a value of the counter at time t1 as measured by the clock 140, and compute a difference between the value of the counter at time t1 and the value of the counter at time t0, according to an illustrative embodiment.

The DCA 168 includes a memory (not shown) for storing raw sensor/error detection data received from the sensors 156 (when included) and the error detectors 164 and/or sensor/error detection information generated by the DCA 168. In some embodiments, the DCA 168 is configured to store in the memory respective data structures that include i) respective sensor/error detection information such as discussed above, and ii) respective time information, as measured by the clock 140, that corresponds to the respective sensor/error detection information. In some embodiments, the DCA 168 is configured to also store in each of at least some of the data structures an indicator of the sensor/error detector that corresponds to the sensor/error detection information in the data structure. In some embodiments, the DCA 168 is configured to store additionally or alternatively in each of at least some of the data structures an indicator of a device (e.g., an indicator of the switch 104, an indicator of a PHY processor 108, an indicator of the re-timer/gearbox, etc.) that corresponds to the sensor/error detection information in the data structure. In some embodiments, the DCA 168 is configured to store additionally or alternatively in each of at least some of the data structures an indicator of a system (e.g., an indicator of the network device 100, etc.) that corresponds to the sensor/error detection information in the data structure.

In some embodiments, the DCA 168 is configured to transmit data structures such as described above to the host processor 196 and/or another suitable host processor.

Each PHY processor 108 includes a respective set of one or more sensor(s) 172 that are configured to monitor one or more physical characteristics of at least one of i) a respective IC chip corresponding to the PHY processor 108, and ii) an electrical signal corresponding to the PHY processor 108. For example, the PHY processor 108 is implemented at least partially on an IC chip 176 and a temperature sensor 172 is configured to measure a temperature of the IC chip 176, according to an embodiment. As another example, a power supply sensor 172 is configured to measure one or more physical characteristics (e.g., a voltage level) of a power supply signal of the PHY processor 108, according to an embodiment. As yet another example, a signal sensor 172 is configured to measure one or more physical characteristics (e.g., an SNR, an SINR, a voltage amplitude, a power level, etc.) of a signal on a communication link 112/124, according to an embodiment. As yet another example, a signal sensor 172 is configured to measure one or more physical characteristics (e.g., an SNR, an SINR, a voltage amplitude, a power level, etc.) of a signal received via a port 116 coupled to the PHY processor 108, according to an embodiment. In some embodiments, the PHY processor 108 includes none of, one of, or any suitable combination of two or more of i) a temperature sensor 172, ii) a power supply voltage sensor 172, iii) a respective sensor 176 for each of at least some of the communication links 112/124, and iv) a respective sensor 176 for each of at least some of the ports 116 coupled to the PHY processor 108.

In some embodiments, one or more of the sensor(s) 172 are coupled to the clock 144 and are configured to determine times, as measured by the clock 144, corresponding to measurements and/or events, and/or time intervals associated with raw sensor data output by the sensor 172.

The sensor(s) 172 are similar to the sensor(s) 156 and are not discussed in further detail for brevity.

In some embodiments, each of one or more of the transceiver sets 108 includes one or more error detectors 180. For example, the PHY processor 108 includes a bit error detector 180 (e.g., a CRC error detector or another suitable bit error detector, within a Viterbi decoder, etc.) that is configured to generate an indicator of a number of bit errors detected by the bit error detector 180 in a frame received by the PHY processor 108 via a communication link 112/124 or a port 116, according to an embodiment. The bit error detector 180 is also configured to generate a rate at which the bit error detector 180 detects errors in bits received by the PHY processor 108, according to an embodiment. In some embodiments, the bit error detector 180 is omitted from one or more of the transceiver sets 108.

As another example, the PHY processor 108 includes an FEC decoder that is configured to generate an indicator of a number of bit errors detected by the FEC decoder in an FEC codeword received by the PHY processor 108 via a communication link 112/124 or a port 116, according to an embodiment. The FEC decoder is also configured to generate a rate at the PHY processor 108 received uncorrectable FEC codewords via a communication link 112/124 or a port 116, according to an embodiment. In some embodiments, the FEC decoder is omitted from one or more of the transceiver sets 108.

In some embodiments, the error detector 180 is coupled to the clock 144 and is configured to determine times, as measured by the clock 144, corresponding to the measurements and/or events; and/or time intervals associated with raw error detection data output by the error detector 180.

The error detector(s) 180 are similar to the error detector(s) 164 and are not discussed in further detail for brevity.

The PHY processor 108 also includes a DCA 184 is configured to collect i) raw sensor data from the sensor(s) 172 and ii) raw time data measured by the clock 144 that indicates times corresponding to the raw sensor data collected by the DCA 184. The DCA 184 is also configured to i) generate sensor information that corresponds to the raw sensor data and ii) time information corresponding to the raw time data.

When the PHY processor 108 includes error detector(s) 180, the DCA 184 is also configured to collect i) raw error detection data from the error detector(s) 180 and ii) raw time data measured by the clock 144 that indicates times corresponding to the raw error detection data collected by the DCA 184. The DCA 184 is also configured to generate i) error detection information that corresponds to the raw error detection data and ii) time information corresponding to the raw time data.

The DCA 184 is similar to the DCA 168 and is not discussed in further detail for brevity.

The re-timer/gearbox 120 includes one or more sensor(s) 188 that are configured to monitor one or more physical characteristics of at least one of i) a respective IC chip corresponding to the re-timer/gearbox 120, and ii) an electrical signal corresponding to the re-timer/gearbox 120. For example, the re-timer/gearbox 120 is implemented at least partially on an IC chip 190 and a temperature sensor 188 is configured to measure a temperature of the IC chip 190, according to an embodiment. As another example, a power supply sensor 188 is configured to measure one or more physical characteristics (e.g., a voltage level) of a power supply signal of the re-timer/gearbox 120, according to an embodiment. As yet another example, a signal sensor 188 is configured to measure one or more physical characteristics (e.g., an SNR, an SINR, a voltage amplitude, a power level, etc.) of a signal on a communication link 112/124, according to an embodiment. In some embodiments, the re-timer/gearbox 120 includes none of, one of, or any suitable combination of two or more of i) a temperature sensor 188, ii) a power supply voltage sensor 188, and iii) a respective sensor 188 for each of at least some of the communication links 112/124 coupled to the re-timer/gearbox 120.

In some embodiments, the sensor 188 is coupled to the clock 148 and is configured to determine times, as measured by the clock 148, corresponding to the events and/or measurements; and/or time intervals associated with raw sensor data output by the sensor 188.

The sensor(s) 188 are similar to the sensor(s) 156 and are not discussed in further detail for brevity.

In some embodiments, the re-timer/gearbox 120 includes one or more error detectors 192. For example, the re-timer/gearbox 120 includes a bit error detector 192 (e.g., a parity-based error detector, a CRC error detector, etc., or another suitable bit error detector) that is configured to generate an indicator of a number of bit errors detected by the bit error detector 192 in a frame received by the re-timer/gearbox 120 via a communication link 112/124, according to an embodiment. The bit error detector 192 is also configured to generate a rate at which the bit error detector 192 detects errors in bits received by the re-timer/gearbox 120, according to an embodiment. In some embodiments, the bit error detector 192 is omitted from the re-timer/gearbox 120.

As another example, the re-timer/gearbox 120 includes an FEC decoder that is configured to generate an indicator of a number of bit errors detected by the FEC decoder in an FEC codeword received by the re-timer/gearbox 120 via a communication link 112/124, according to an embodiment. The FEC decoder is also configured to generate a rate at the re-timer/gearbox 120 received uncorrectable FEC codewords via a communication link 112/124, according to an embodiment. In some embodiments, the FEC decoder is omitted from the re-timer/gearbox 120.

As another example, the re-timer/gearbox 120 includes a frame error detector 192 that is configured to generate i) an indicator of a number of frame errors in frames and/or ii) an indicator of a rate of frame errors in frames received by the re-timer/gearbox 120 includes via a communication link 112/124, according to an embodiment. In some embodiments, the frame error detector comprises a bit error detector (e.g., a parity-based error detector, a CRC error detector, or another suitable bit error detector) that is configured to generate an indicator of at least one bit error in a frame received by the re-timer/gearbox 120 includes via a communication link 112/124. In an embodiment, when the bit error detector detects at least one bit error in a frame after an FEC decoder processes one or more codewords corresponding to the frame (i.e., the FEC decoder was unable to correct one or more errors in the one or more codewords), a frame error is detected. In some embodiments, the frame error detector 192 is omitted from the re-timer/gearbox 120.

In some embodiments, the error detector 192 is coupled to the clock 148 and is configured to determine times, as measured by the clock 148, corresponding to the events and/o measurements; and/or time intervals associated with raw error detection data output by the error detector 192.

The error detector(s) 192 are similar to the error detector(s) 164 and are not discussed in further detail for brevity.

The re-timer/gearbox 120 also includes a DCA 194 is configured to collect i) raw sensor data from the sensor(s) 188 and ii) raw time data measured by the clock 148 that indicates times corresponding to the raw sensor data collected by the DCA 194. The DCA 194 is also configured to i) generate sensor information that corresponds to the raw sensor data and ii) time information corresponding to the raw time data.

When the re-timer/gearbox 120 includes error detector(s) 192, the DCA 194 is also configured to collect i) raw error detection data from the error detector(s) 192 and ii) raw time data measured by the clock 148 that indicates times corresponding to the raw error detection data collected by the DCA 192. The DCA 194 is also configured to generate i) error detection information that corresponds to the raw error detection data and ii) time information corresponding to the raw time data.

The DCA 194 is similar to the DCA 168 and is not discussed in further detail for brevity.

The DCAs 168/184/194 are communicatively coupled to a host processor 196, and are configured to provide sensor information, error detection information, and corresponding time information to the host processor 196. In one embodiment, the host processor 196 is a component of the network device 100. In other embodiments, the host processor 196 is separate from the network device 100 and communicatively coupled to the network device 100. For example, the host processor 196 is coupled to the network device 100 and one or more other network devices (not shown) similar to the network device 100, and is configured to receive sensor information, error detection information, and corresponding time information from multiple network devices including the network device 100.

As described above, the clocks 140/144/148 are synchronized and thus the time information output by the DCAs 168/184/194 is based on a common time reference, which allows the host processor 196 to correlate (with respect to time) sensor information and/or error detection information from different sensors 156/172/188 and/or error detectors 164/180/192.

In embodiments in which the clocks 140/144/148 are synchronized with a global time, and in which the host processor 196 also receives sensor information, error detection information, and corresponding time information from other network devices, separate from the network device 100, that have sensors, error detectors, DCAs, and clocks that are also synchronized with the global time, the host processor 196 is able to correlate (with respect to time) sensor information and/or error detection information from different sensors and/or error detectors across the multiple network devices.

In an embodiment, the host processor 196 includes or is coupled to a clock 198. In an embodiment, the clock 198 is incremented based on an output of an oscillator (not shown) that is different than the oscillator 152 of the network device 100. In another embodiment, the clock 198 is incremented based on an output of the oscillator 152 and thus the clock 198 is frequency synchronized with the clocks 140/144/148. In some embodiments, the oscillator 152 is located proximate to the host processor 196, and an output of the oscillator 152 is provided to the clocks 140/144/148.

In an embodiment, the clock 198 is synchronized with the global time, and the host processor 196 initializes the clocks 140/144/148 by sending an initial global time reference, obtained from the clock 198, to the clocks 140/144/148. The clocks 140/144/148 use the initial global time reference to initialize the clocks 140/144/148 so that respective times maintained by the clocks 140/144/148 are synchronized to the global time.

In another embodiment, the clock 198 is synchronized with the global time, and the host processor 196 initializes the clock 140 of the network switch 104 by sending a first initial global time reference, obtained from the clock 198, to the clock 140. The clock 140 uses the first initial global time reference to initialize the clock 140 so that the time maintained by the clock 140 is synchronized to the global time. Then, the network switch 104 in turn initializes the clocks 144/148 of the transceiver sets 108 and the re-timer/gearbox by sending a second initial global time reference, obtained from the clock 140, to the clocks 144/148. The clocks 144/148 use the initial second global time reference to initialize the clocks 144/148 so that respective times maintained by the clocks 144/148 are synchronized to the global time.

In some embodiments, after the clocks 140/144/148 are initialized and to maintain synchronization, the clocks 140/144/148 periodically receive further global time references, and the clocks 140/144/148 use the further global time references to adjust (if necessary) the respective times maintained by the clocks 140/144/148 so that the clocks 140/144/148 remain synchronized to the global time. The further global time references are sent to the clocks 140/144/148 at a suitable time interval, such as every second or some other suitable time interval, in an embodiment. Generally, a suitable time interval is selected so that respective differences between the times maintained by the clocks 140/144/148 and the global time remain within a suitable defined margin of error.

In some embodiments, the host processor 196 periodically sends further global time references, obtained from the clock 198, to the clocks 140/144/148. In embodiments in which the clocks 140/144/148/198 are incremented based on an output of the same oscillator 152 and thus are frequency synchronized, the further global time references may be used for reinitializing one or more of the clocks 140/144/148 in case of an error, and the time interval may be relatively long as compared to when the clocks 140/144/148/198 are incremented based on respective outputs of two or more different oscillators.

In an embodiment, the clock 198 is synchronized with the global time, and the host processor 196 periodically sends first further global time references, obtained from the clock 198, to the clock 140. The clock 140 uses the first further global time references to adjust (when necessary) the time maintained by the clock 140 so that the clock 140 remains synchronized to the global time. The first further global time references are sent to the clock 140 at a suitable time interval, such as every second, in an embodiment. Generally, a suitable time interval is selected so that a difference between the time maintained by the clock 140 and the global time remain within a suitable defined margin of error. Additionally, the network switch 104 periodically sends second further global time references, obtained from the clock 140, to the clocks 144/148. The clocks 144/148 use the second further global time references to adjust (when necessary) the respective times maintained by the clocks 144/148 so that the clocks 144/148 remain synchronized to the global time. The second further global time references are sent to the clocks 144/148 at a suitable time interval, such as every second or some other suitable time interval, in an embodiment. Generally, a suitable time interval is selected so that respective differences between the times maintained by the clocks 144/148 and the clock 140 remain within a suitable defined margin of error.

In embodiments in which the clocks 140/144/148 are incremented based on the output of the same oscillator 152 and thus are frequency synchronized, the second further global time references may be used for reinitializing one or more of the clocks 144/148 in case of an error, and the time interval may be relatively long as compared to when the clocks 140/144/148 are incremented based on respective outputs of two or more different oscillators.

FIG. 1 illustrates the switch 104 providing synchronization signals to the transceiver sets 108 and the re-timer/gearbox 120. The synchronization signals comprise one or both of i) initial global time references and ii) further global time references as discussed, according to some embodiments. In other embodiments, the synchronization signals provided by the switch 104 to the transceiver sets 108 and the re-timer/gearbox 120 additionally or alternatively include another suitable signal that the transceiver sets 108 and the re-timer/gearbox 120 use to synchronize the clocks 144/148 to the clock 140. For example, in some embodiments, the synchronization signals provided by the switch 104 to the transceiver sets 108 and the re-timer/gearbox 120 include a pulse with a suitable frequency (e.g., a pulse-per-second signal, etc.) that the transceiver sets 108 and the re-timer/gearbox 120 use to synchronize the clocks 144/148 to the clock 140. As another example, in some embodiments, the synchronization signals provided by the switch 104 to the transceiver sets 108 and the re-timer/gearbox 120 include a clock signal generated based on the clock 140 that the transceiver sets 108 and which the re-timer/gearbox 120 use to synchronize the clocks 144/148 to the clock 140.

In some embodiments, the host processor 196 provides synchronization signals, such as described above, directly to the transceiver sets 108 and the re-timer/gearbox 120 that the transceiver sets 108 and the re-timer/gearbox 120 use to synchronize the clocks 144/148 to the global time. In some embodiments in which the host processor 196 provides synchronization signals to the transceiver sets 108 and/or the re-timer/gearbox 120, at least some synchronization signals from the switch 104 to the transceiver sets 108 and/or the re-timer/gearbox 120 are omitted. Similarly, in some embodiments in which the switch 104 provides synchronization signals to the transceiver sets 108 and/or the re-timer/gearbox 120, at least some synchronization signals from the host processor 196 to the transceiver sets 108 and/or the re-timer/gearbox 120 are omitted.

In some embodiments, the network switch 104 is configured to operate according to the Precision Time Protocol (PTP) to synchronize the clock 140 to the global time. In other embodiments, the network switch 104 is configured to operate according to the Institute for Electrical and Electronics Engineers (IEEE) 802.1AS Standard to synchronize the clock 140 to the global time. In other embodiments, the network switch 104 is configured to operate according to the Network Time Protocol (NTP) to synchronize the clock 140 to the global time. In other embodiments, the network switch 104 is configured to operate according to another suitable time synchronization protocol, such as a proprietary protocol, to synchronize the clock 140 to the global time. In some embodiments in which the network switch 104 operates according to a suitable time synchronization protocol (e.g., PTP, IEEE 802.1AS, NTP, a proprietary protocol, etc.) to synchronize the clock 140 to the global time, the network switch 104 initializes one or more of the clocks 144/148 of the transceiver sets 108 and/or the re-timer/gearbox 120 and maintains synchronization between the clock 140 and the one or more of the clocks 144/148 by sending reference times, determined by the clock 140, to the one or more of the clocks 144/148 as discussed above.

In other embodiments, one or more of the transceiver sets 108 and the re-timer/gearbox 120 are additionally or alternatively configured to operate according to the PTP to synchronize one or more of the clocks 144/148 to the global time. In other embodiments, the one or more of the transceiver sets 108 and the re-timer/gearbox 120 are additionally or alternatively configured to operate according to the IEEE 802.1AS Standard to synchronize one or more of the clocks 144/148 to the global time. In other embodiments, the one or more of the transceiver sets 108 and the re-timer/gearbox 120 are additionally or alternatively configured to operate according to NTP to synchronize one or more of the clocks 144/148 to the global time. In other embodiments, the one or more of the transceiver sets 108 and the re-timer/gearbox 120 are additionally or alternatively configured to operate according to another suitable time synchronization protocol, such as a proprietary protocol, to synchronize one or more of the clocks 144/148 to the global time.

In some embodiments, one or more of the clocks 140/144/148 are configured to maintain a time in units of nanoseconds. In some embodiments, one or more of the clocks 140/144/148 is configured to maintain a time in units of fractional nanoseconds. In other embodiments, one or more of the clocks 140/144/148 is configured to maintain a time with lower precision than units of nanoseconds to reduce complexity and/or cost, such as units of tens of nanoseconds.

In some embodiments, the clock 140 is configured to maintain a time within ±1 nanosecond of the global time, and the network switch 104 initializes one or more of the clocks 144/148 of the transceiver sets 108 and/or the re-timer/gearbox 120 and maintains synchronization between the clock 140 and the one or more of the clocks 144/148 by sending reference times, determined by the clock 140, to the one or more of the clocks 144/148 as discussed above.

In other embodiments, the clock 140 is configured to maintain a time within $±2^{-16}$ seconds (e.g., a fraction of a nanosecond) of the global time, and the network switch 104 initializes one or more of the clocks 144/148 of the transceiver sets 108 and/or the re-timer/gearbox 120 and maintains synchronization between the clock 140 and the one or more of the clocks 144/148 by sending reference times, determined by the clock 140, to the one or more of the clocks 144/148 as discussed above.

In other embodiments, the clock 140 is configured to maintain a time within tens of nanoseconds of the global time, and the network switch 104 initializes one or more of the clocks 144/148 of the transceiver sets 108 and/or the re-timer/gearbox 120 and maintains synchronization between the clock 140 and the one or more of the clocks 144/148 by sending reference times, determined by the clock 140, to the one or more of the clocks 144/148 as discussed above.

In other embodiments, the clock 140 is configured to maintain a time with another suitable precision with respect to the global time.

Figure 2:
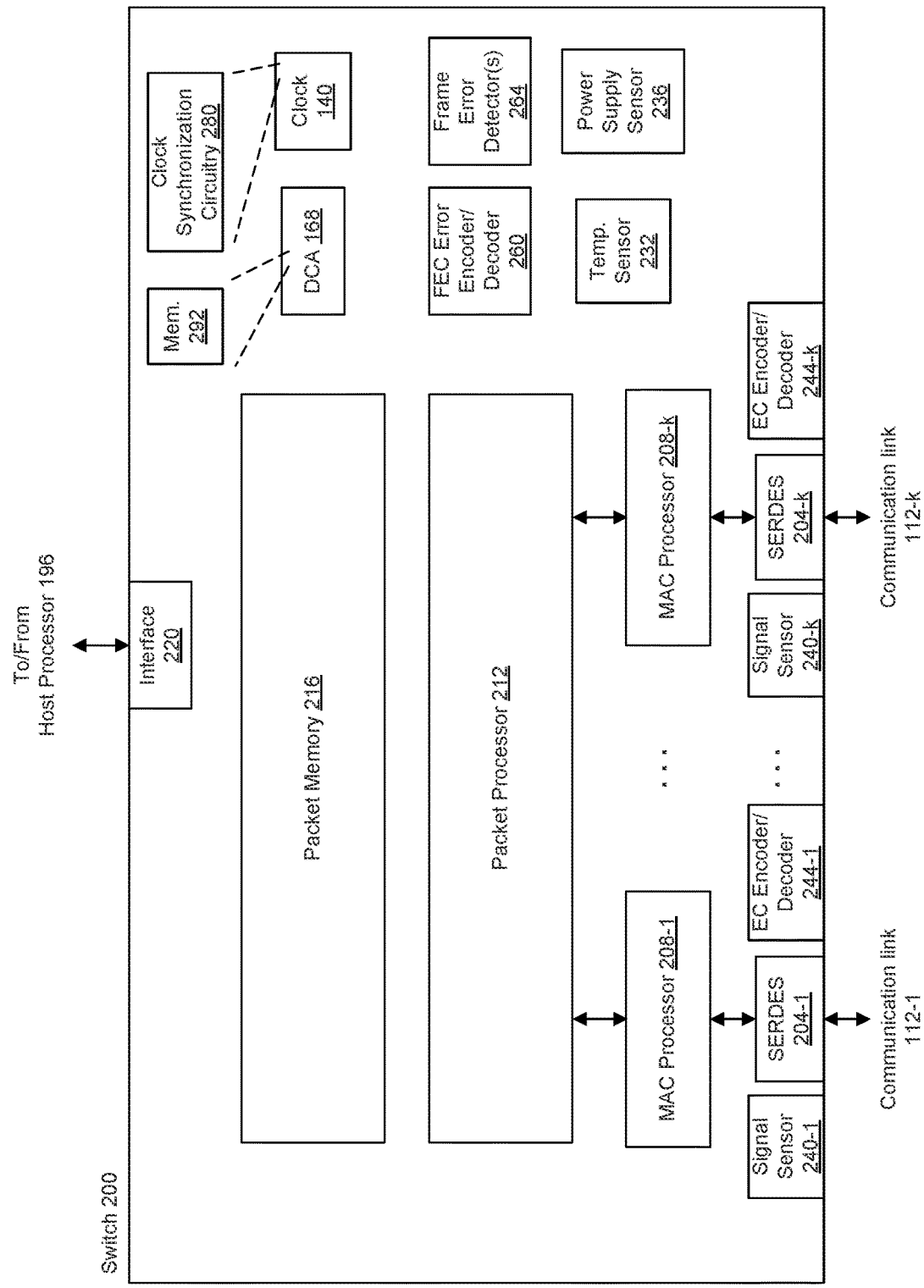
FIG. 2 is a simplified diagram of an example network switch of the network device of FIG. 1, according to an embodiment.

FIG. 2 is a simplified diagram of an example network switch 200, according to an embodiment. The network switch 200 is used in the example network device 100 as the network switch 104, in an embodiment. The network switch 200 is described with reference to FIG. 1 for ease of explanation, and like-numbered elements are not described in detail for brevity. In other embodiments, the network switch 104 is a suitable network switch different than the network switch 200 of FIG. 2. In some embodiments, the network switch 200 is included in another suitable network device different than the network device 100 of FIG. 1.

The network switch 200 is configured to couple to one or more transceiver sets (e.g., such as the transceiver sets 108) and/or one or more re-timers/gearboxes (e.g., such as the re-timer/gearbox 120) via one or more respective communication links (e.g., the communication links 112) of a network device that includes the network switch 200 (such as the network device 100). In some embodiments, each communication link 112 comprises a serial communication link. In some such embodiments, the network switch 200 includes a respective serializer-deserializer (SERDES) 204 for each communication link 112. In some embodiments, each of at least some of the communication links 112 include a plurality of lanes.

The SERDES 204 are configured to transmit to and receive packets from respective transceiver sets 108 or respective re-timers/gearboxes 120 via respective serial communication links 112, in an embodiment. In some embodiments, each of one or more of the SERDES 204 is configured to transmit and receive via a respective communication link 112 that includes a plurality of lanes.

The network device 100 includes one or more media access control (MAC) processors 208. The MAC processors 208 are configured to perform MAC layer protocol operations with respect to packets that are received via the communication links 112 and that are to be transmitted via the communication links 112, in an embodiment. Each SERDES 204 is configured to receive packet data in a parallel format from a respective MAC processor 208 and convert the data in the parallel format into serial data, which is then transferred to a respective transceiver set or re-timer/gearbox via the respective serial communication link 112. Similarly, the SERDES 204 is configured to receive serial packet data from the respective transceiver set or re-timer/gearbox via the serial communication link 112 and convert the serial packet data to packet data in a parallel format, which is then transferred to the respective MAC processor 208.

In an embodiment, one or more of the communication links 112 comprise a media-independent interface, such as the universal serial 10 gigabit Ethernet media-independent interface (USXGMII) or another suitable media-independent interface. In other embodiments, one or more of the communication links 112 additionally or alternatively comprise another suitable interface.

The network switch 200 also includes a packet processor 212. The packet processor 212 is configured to process at least header of packets received via the communication links 112 to determine communication links 112 and/or ports 116 via which the packets are to be transmitted. The network switch 200 further includes a packet memory 216 configured to store packets while the packets are processed by the packet processor 212.

The network switch 200 also includes a host communication interface 220 configured to handle communications with a host processor (e.g., the host processor 196). The host communication interface 220 comprises a suitable communication interface such as an Ethernet interface or another suitable communication interface. In some embodiments, the host communication interface 220 is omitted and the network switch 200 communicates with the host processor 196 via one of the MAC processors 208.

The network switch 200 includes the clock 140 and the DCA 168 discussed above with reference to FIG. 1.

The network switch 200 includes a temperature sensor 232 that is configured to measure a temperature of an IC chip (e.g., the IC chip 160) on which the switch 200 is at least partially implemented, according to an embodiment. In another embodiment, the temperature sensor 232 is omitted.

The network switch 200 also includes a power supply sensor 236 that is configured to measure one or more physical characteristics (e.g., a voltage level) of a power supply signal of the network switch 200, according to an embodiment. In another embodiment, the power supply sensor 236 is omitted.

The network switch 200 also includes one or more signal sensors 240 that are configured to measure one or more physical characteristics (e.g., an SNR, an SINR, a voltage amplitude, a power level, etc.) of one or more signals on the one or more communication links 112. In an embodiment, the network switch 200 includes a respective signal sensor 240 for each lane of the one or more communication links 112. In another embodiment, the signals sensors 240 are omitted.

The network switch 200 also includes one or more error correction (EC) encoders/decoders 244 that are configured to perform EC encoding and decoding of transmit and receive signals corresponding to the one or more communication links 112. In an embodiment, each of one or more of the EC encoders/decoders 244 includes a convolutional code encoder such as a Trellis encoder or another suitable convolutional code encoder and a convolutional code decoder such as a Viterbi decoder or another suitable convolutional code decoder. In other embodiments, the one or more of the EC encoders/decoders 244 include another suitable EC encoder and another suitable EC decoder. The EC encoders/decoders 244 are configured to generate bit error information regarding signals received via the communication links 112, such as a count of bit errors, a bit error rate, a number of bit errors in a particular time interval, etc., according to an embodiment. In other embodiments, the EC encoders/decoders 244 are omitted or the EC encoders/decoders 244 are not configured to output bit error information such as one or more of a count of bit errors, a bit error rate, and a number of bit errors in a particular time interval.

In some embodiments, one or more of the encoders/decoders 244 includes one or more respective counters for counting numbers of bit errors detected by the encoders/decoders 244.

The network switch 200 also includes one or more FEC encoders/decoders 260 that are configured to perform FEC encoding and decoding of packets to be transmitted or received via the one or more communication links 112. In an embodiment, each of one or more of the FEC encoders/decoders 260 includes a suitable FEC encoder such as an LDPC encoder, an RS encoder, or another suitable FEC encoder, and a suitable FEC decoder such as an LDPC decoder, a RS decoder, or another suitable FEC decoder. The one or more FEC encoders/decoders 260 are configured to generate error information regarding packets received via a communication link 112, such as one of or any suitable combination of two or more of i) an indicator of an uncorrectable codeword, ii) an uncorrectable codeword error rate, iii) a number of uncorrectable code words in a particular time interval, iv) a number of bit errors in a codeword, v) a bit error rate, vi) a number of bit errors in a particular time interval, vii) a count of bit errors, etc., according to an embodiment. In other embodiments, the one or more FEC encoders/decoders 260 are omitted.

In some embodiments, one or more of the FEC encoders/decoders 260 includes one or more respective counters for counting numbers of uncorrectable FEC codewords detected by the FEC encoders/decoders 260.

Although the one or more FEC encoders/decoders 260 are illustrated as being separate from the packet processor 212, in some embodiments the one or more FEC encoders/decoders 260 are components of the packet processor 212.

The network switch 200 also includes one or more frame error detectors 264 that are configured to detect frame (or packet) errors corresponding to packets received via the one or more communication links 112. The one or more frame error detectors 264 are configured to generate one of or any suitable combination of two or more of i) an indicator a frame error corresponding to a packet received via a communication links 112, ii) a rate of frame errors corresponding to packets received via a communication links 112, iii) an indicator of a number of frame errors corresponding to packets received via a communication links 112 in a particular time interval, iv) a count of frame errors, etc., according to an embodiment. In some scenarios, a frame includes one or more FEC codewords, and at least one uncorrectable FEC codeword in the frame results in a frame error. In other scenarios, a single FEC codeword spans multiple frames, and an uncorrectable FEC codeword results in multiple frame errors. In some embodiments, the frame error detector comprises a bit error detector (e.g., a parity-based error detector, a CRC error detector, or another suitable bit error detector) that is configured to generate an indicator of at least one bit error in a frame received by the network switch 104 via a communication link 112. In an embodiment, when the bit error detector detects at least one bit error in a frame after an FEC decoder 260 processes one or more codewords corresponding to the frame (i.e., the FEC decoder 260 was unable to correct one or more errors in the one or more codewords), a frame error is detected.

In some embodiments, one or more of the frame error detectors 264 includes one or more respective counters for counting numbers of frame errors detected by the frame error detectors 264.

Although the one or more frame error detectors 264 are illustrated as being separate from the packet processor 212, in some embodiments the one or more frame error detectors 264 are components of the packet processor 212.

The clock 140 includes clock synchronization circuitry 280 that is configured to synchronize the clock 140 with a global time. In an embodiment, the clock synchronization circuitry 280 is configured to receive an initial global time reference from a host processor (e.g., the host processor 196) and to use the initial global time reference to adjust the clock 140 so that the time maintained by the clock 140 corresponds to the global time. In some embodiments, the clock synchronization circuitry 280 is configured to, after the clock 140 is initialized and to maintain synchronization, receive further global time references from the host processor, and to use the further global time references to adjust (if necessary) the time maintained by the clock 140 so that the clock 140 remains synchronized to the global time. In some embodiments, the clock synchronization circuitry 280 is configured to receive the further global time references from the host periodically.

In some embodiments, the clock synchronization circuitry 280 receives the initial global time reference and the further global time references from the host processor via the communication interface 220. In other embodiments, the clock synchronization circuitry 280 receives the initial global time reference and the further global time references via one of the communication links 112, optionally via one of the ports 116, optionally via one of the transceiver sets 108, optionally via one of the re-timer/gearboxes 120, and optionally via one of the ports 116. In other embodiments, the clock synchronization circuitry 280 receives the initial global time reference and the further global time references via another communication interface (not shown in FIGS. 1 and 2) of the switch 200 different from the communication interface 220 and not via one of the communication links 112.

In some embodiments, the clock synchronization circuitry 280 is configured to operate according to the PTP to synchronize the clock 140 to the global time. In other embodiments, the clock synchronization circuitry 280 is configured to operate according to the IEEE 802.1AS Standard to synchronize the clock 140 to the global time. In other embodiments, the clock synchronization circuitry 280 is configured to operate according to the NTP to synchronize the clock 140 to the global time. In other embodiments, the clock synchronization circuitry 280 is configured to operate according to another suitable time synchronization protocol, such as a proprietary protocol, to synchronize the clock 140 to the global time. In some embodiments in which the clock synchronization circuitry 280 operates according to a suitable time synchronization protocol (e.g., PTP, IEEE 802.1AS, NTP, a proprietary protocol, etc.) to synchronize the clock 140 to the global time, the clock synchronization circuitry 280 is configured to exchange timing messages with another device such as a master source of time, as specified by the time synchronization protocol. In some embodiments, the network switch 200 periodically receives timing messages from the master source of time, which include respective current times of the global time, and the clock synchronization circuitry 280 uses the current times of the global time to adjust the clock 140 so that the clock 140 is synchronized with the global time.

In some embodiments, the network device 200 receives the time synchronization protocol timing messages via the communication interface 220. In other embodiments, network device 200 receives the time synchronization protocol timing messages via one of the communication links 112, optionally via one of the ports 116, optionally via one of the transceiver sets 108, optionally via one of the re-timer/gearboxes 120, and optionally via one of the ports 116. In other embodiments, the network device 200 receives the time synchronization protocol timing messages via another communication interface (not shown in FIGS. 1 and 2) of the switch 200 different from the communication interface 220 and not via one of the communication links 112.

In some embodiments, the clock synchronization circuitry 280 is configured to synchronize clocks of other network devices such as one or more of the clocks 144/148 of the transceiver sets 108 and/or the re-timer/gearbox 120 by sending reference times, determined by the clock 140, to the one or more of the clocks 144/148 as discussed above. In some embodiments, the clock synchronization circuitry 280 is configured to send reference times to one or more of the clocks 144/148 via one or more of the communication links 112. In other embodiments, the clock synchronization circuitry 280 is configured to send reference times to one or more of the clocks 144/148 via one or more other communication interface (not shown in FIGS. 1 and 2) of the switch 200 different than the communication links 112.

Although the clock synchronization circuitry 280 is illustrated as being a component of the clock 140, in some embodiments the clock synchronization circuitry 280 is a component of other element of the network device 200, such as the DCA 168, the packet processor 212, a controller of the network switch 200 (not shown), or some other suitable element of the network device 200 (including elements not shown in FIG. 2).

The DCA 168 is configured to collect i) raw error detection data from a) the temperature sensor 232 (when included), b) the power supply sensor 236 (when included), c) the signal sensors 240 (when included), d) the EC encoders/decoders 244 (when included), e) the FEC error encoder/decoder 260 (when included), and f) the frame error detector 264 (when included), and ii) raw time data measured by the clock 140 that indicates times corresponding to the raw error detection data collected by the DCA 168, as discussed above. The DCA 168 is also configured to generate i) error detection information that corresponds to the raw error detection data, ii) optionally sensor information that corresponds to the raw sensor data, and iii) time information corresponding to the raw time data and the global time, as discussed above.

The DCA 168 includes a memory 292 that is configured to store one of or any suitable combination of two or more of: i) raw sensor data, ii) raw error detection data, iii) error detection information generated by the DCA 168 using the raw error detection data, iv) sensor information generated by the DCA 168 using the raw sensor data, and v) time information corresponding to the raw time data and the global time reference, as discussed above.

In some embodiments, the DCA 168 is configured to store in the memory 292, along with error detection/sensor information generated by the DCA 168 as discussed above, an indicator of the sensor/error detector corresponding to the error detection/sensor information. As merely an illustrative example, when the DCA 168 stores in the memory 292 an indication of an event corresponding to an SNR level (e.g., the SNR level falling below a threshold), the DCA 168 also stores in the memory 292 an indication of a particular signal sensor 240 that corresponds to the event. As merely another illustrative example, when the DCA 168 stores in the memory 292 an indication of an event corresponding to a bit error rate (e.g., the bit error rate going above a threshold), the DCA 168 also stores in the memory 292 an indication of an EC encoder/decoder 244 that corresponds to the event.

In some embodiments, the DCA 168 is additionally or alternatively configured to store in the memory 292, along with error detection/sensor information generated by the DCA 168 as discussed above, an indicator of the switch 200. As merely an illustrative example, when the DCA 168 stores in the memory 292 an indication of an event corresponding to a temperature (e.g., the temperature going above a threshold), the DCA 168 also stores in the memory 292 an indication of the switch 200. As merely another illustrative example, when the DCA 168 stores in the memory 292 an indication of an event corresponding to a power supply (e.g., a voltage level of the power supply dropping below a threshold), the DCA. 168 also stores in the memory 292 an indication of the switch 200.

In some embodiments, the DCA 168 is additionally or alternatively configured to store in the memory 292, along with error detection/sensor information generated by the DCA 168 as discussed above, an indicator of a network device (e.g., the network device 100) corresponding to the error detection/sensor information.

As discussed above, in some embodiments the DCA 168 is configured to collect data from one error detector/sensor in response to an event detected by another detector/sensor. As an illustrative example, in response to an output of a sensor meeting a threshold (e.g., a temperature measured by the temperature sensor 232 meeting a threshold, an SNR measured by a signal sensor 240 meeting a threshold, a power supply voltage level measured by the power supply sensor 236 falling below a threshold, etc.), the DCA 168 collects error detection data from an error detector (e.g., a count of bit errors by an EC encoder/decoder 244 over a time interval, a bit error rate determined by the EC encoder/decoder 244, a count of uncorrectable codewords by the FEC error encoder/decoder 260 over the time interval, a rate of uncorrectable codewords determined by the FEC error encoder/decoder 260, a count of frame errors over the time interval determined by the frame error detector 264, a rate of frame errors determined by the frame error detector 264, etc.), according to an embodiment. As another illustrative example, in response to an output of an error detector meeting a threshold (e.g., a count of bit errors determined by the EC encoder/decoder 244 over a time interval meeting a threshold, a bit error rate determined by the EC encoder/decoder 244 meeting a threshold, a count of uncorrectable codewords determined by the FEC error encoder/decoder 260 over the time interval meeting a threshold, a rate of uncorrectable codewords determined by the FEC error encoder/decoder 260 meeting a threshold, a count of frame errors determined by the frame error detector 264 over the time interval meeting a threshold, a rate of frame errors determined by the frame error detector 264 meeting a threshold, etc.), the DCA 168 collects sensor data from a sensor (e.g., a temperature measured by the temperature sensor 232, values of temperature measured by the temperature sensor 232 during a time interval, an SNR measured by one of the signal sensors 240, values of the SNR measured by one of the signal sensors 240 over a time interval, a power supply voltage level measured by the power supply sensor 236, values of the power supply voltage level measured by the power supply sensor 236 over a time interval, etc.), according to an embodiment.

Figure 3:
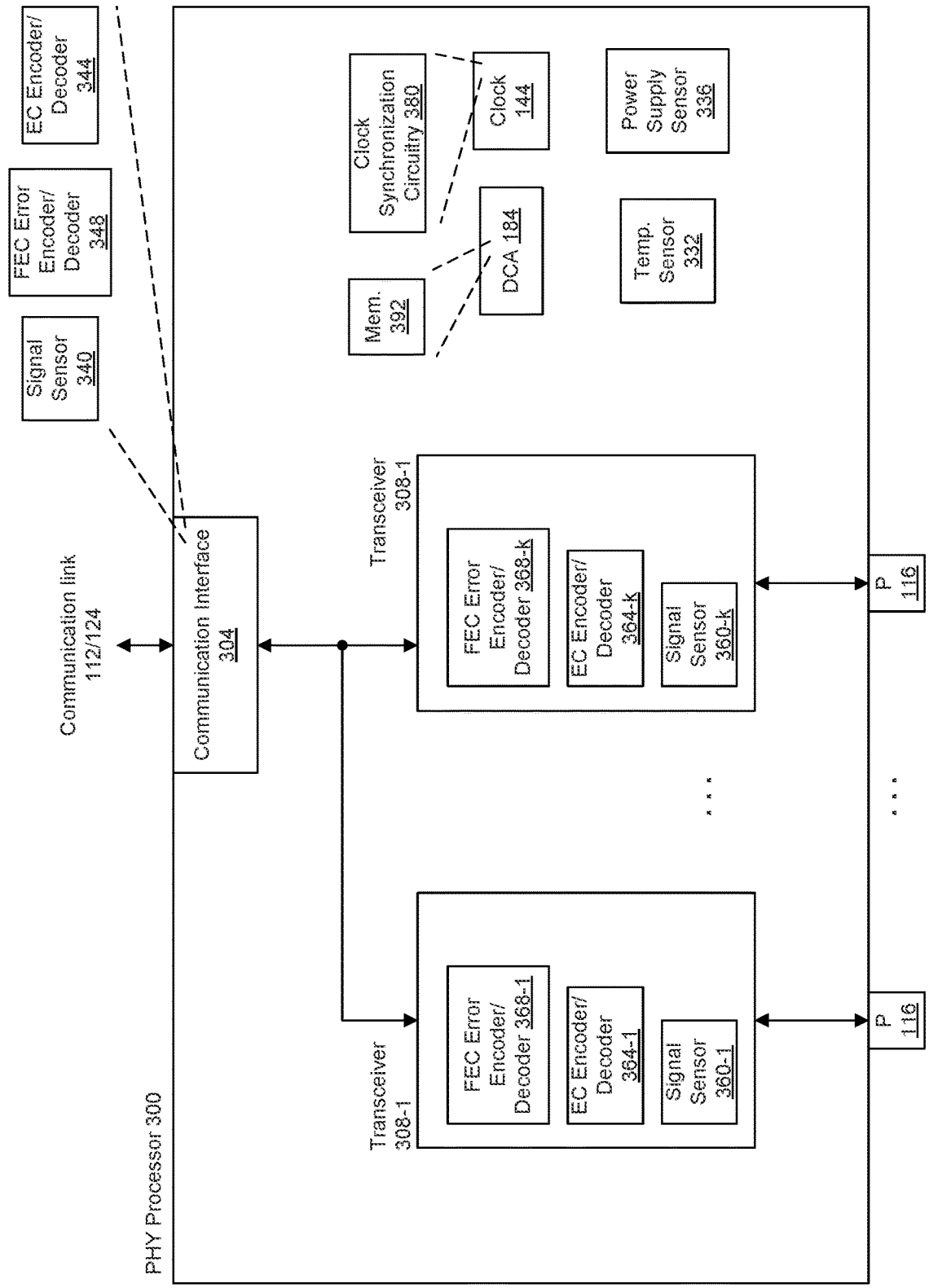
FIG. 3 is a simplified diagram of an example physical layer (PHY) processor of the network device of FIG. 1, according to an embodiment.

FIG. 3 is a simplified diagram of an example PHY processor 300, according to an embodiment. The PHY processor 300 is used in the example network device 100 for one or more of the transceiver sets 108, in an embodiment. The PHY processor 300 is described with reference to FIG. 1 for ease of explanation, and like-numbered elements are not described in detail for brevity. In other embodiments, the PHY processor 108 is a suitable transceiver set different than the PHY processor 300 of FIG. 3. In some embodiments, the PHY processor 300 is included in another suitable network device different than the network device 100 of FIG. 1.

The PHY processor 300 is configured to couple to a network switch or a re-timers/gearbox (e.g., such as the re-timer/gearbox 120) via a communication link (e.g., the communication links 112/124) of a network device that includes the PHY processor 300 (such as the network device 100). In some embodiments, the communication link 112/124 comprises a serial communication link. In some embodiments, the communication link 112/124 includes a plurality of lanes.

The PHY processor 300 includes a communication interface 304 that is configured to transmit to and receive signals from switch 104 or the re-timer/gearbox 120 via the communication link 112/124. In an embodiment, one or more of the communication links 112 comprise a media-independent interface, such as an USXGMII or another suitable media-independent interface, and the communication interface 304 is configured to communicate via the media-independent interface.

The PHY processor 300 also includes one or more transceivers 308 that are configured to couple to one or more respective ports (e.g., one or more ports 116). Although multiple transceivers 308 and multiple ports 116 are illustrated in FIG. 3, the PHY processor 300 includes only one transceiver 308 configured to couple to only one port 116, in another embodiment. Each of at least some of the transceivers 308 comprises an optical transceiver configured to transmit and receive optical signals via an optical fiber, according to an embodiment. Each of at least some of the transceivers 308 comprises a transceiver configured to transmit and receive electrical signals via a metallic (e.g., copper or another suitable metal) cable, according to another embodiment.

The PHY processor 300 includes a temperature sensor 332 that is configured to measure a temperature of an IC chip (e.g., the IC chip 176) on which the PHY processor 300 is at least partially implemented, according to an embodiment. In another embodiment, the temperature sensor 332 is omitted.

The PHY processor 300 also includes a power supply sensor 336 that is configured to measure one or more physical characteristics (e.g., a voltage level) of a power supply signal of the PHY processor 300, according to an embodiment. In another embodiment, the power supply sensor 336 is omitted.

The communication interface 304 includes a signal sensor 340 that is configured to measure one or more physical characteristics (e.g., an SNR, an SINR, a voltage amplitude, a power level, etc.) of one or more signals on the communication link 112/124. In an embodiment, the communication interface 304 includes a respective signal sensor 340 for each lane of the communication link 112/124. In another embodiment, the signals sensor(s) 340 are omitted. The signal sensors 340 are similar to the signal sensors 240, in some embodiments.

Although the signal sensor 340 is illustrated as being a component of the communication interface 304, in some embodiments the signal sensor 340 is separate from the communication interface 304.

The communication interface 304 also includes one or more EC encoders/decoders 344 that are configured to perform EC encoding and decoding of transmit and receive signals corresponding to the communication links 112/124. In an embodiment, each of one or more of the EC encoders/decoders 344 includes a convolutional code encoder such as a Trellis encoder or another suitable convolutional code encoder and a convolutional code decoder such as a Viterbi decoder or another suitable convolutional code decoder. In other embodiments, the one or more of the EC encoders/decoders 344 includes another suitable EC encoder and another suitable EC decoder. The EC encoders/decoders 344 are configured to generate bit error information regarding signals received via the communication link 112/124, such as a bit error rate, a number of bit errors in a particular time interval, etc., according to an embodiment. In other embodiments, the EC encoders/decoders 344 are omitted or the EC encoders/decoders 344 are not configured to output bit error information such as one or both of a bit error rate and a number of bit errors in a particular time interval.

The EC encoders/decoders 344 are similar to the EC encoders/decoders 244, in some embodiments.

Although the one or more EC encoders/decoders 364 are illustrated as being a component of the communication interface 304, in some embodiments the one or more EC encoders/decoders 364 are separate from the communication interface 304.

The communication interface 304 also includes one or more FEC encoders/decoders 348 that are configured to perform FEC encoding and decoding of packets to be transmitted or received via the communication link 112/124. In an embodiment, each of one or more of the FEC encoders/decoders 348 includes a suitable FEC encoder such as an LDPC encoder, an RS encoder, or another suitable FEC encoder, and a suitable FEC decoder such as an LDPC decoder, a RS decoder, or another suitable FEC decoder. The one or more FEC encoders/decoders 348 are configured to generate error information regarding packets received via the communication link 112/124, such as one of or any suitable combination of two or more of i) an indicator of an uncorrectable codeword, ii) an uncorrectable codeword error rate, iii) a number of uncorrectable code words in a particular time interval, iv) a number of bit errors in a codeword, v) a bit error rate, vi) a number of bit errors in a particular time interval, etc., according to an embodiment. In other embodiments, the one or more FEC encoders/decoders 348 are omitted.

The FEC encoders/decoders 348 are similar to the FEC encoders/decoders 260, in some embodiments.

Although the one or more FEC encoders/decoders 348 are illustrated as being a component of the communication interface 304, in some embodiments the one or more FEC encoders/decoders 348 are separate from the communication interface 304.

Each of at least some of the transceivers 308 includes a signal sensor 360 that is configured to measure one or more physical characteristics (e.g., an SNR, an SINR, a voltage amplitude, a power level, etc.) of a signal received via the corresponding port 116. In another embodiment, the signals sensor(s) 360 are omitted. The signal sensors 360 are similar to the signal sensors 240, in some embodiments.

Although the signal sensor 360 is illustrated as being a component of the transceiver 308, in some embodiments the signal sensor 360 is separate from the transceiver 308.

Each of at least some of the transceivers 308 also includes an EC encoder/decoder 364 that is configured to perform EC encoding and decoding of transmit and receive signals corresponding to the port 116. In an embodiment, the EC encoder/decoder 364 includes a convolutional code encoder such as a Trellis encoder or another suitable convolutional code encoder and a convolutional code decoder such as a Viterbi decoder or another suitable convolutional code decoder. In other embodiments, the EC encoder/decoder 364 includes another suitable EC encoder and another suitable EC decoder. The EC encoder/decoder 364 is configured to generate bit error information regarding signals received via the port 116, such as a bit error rate, a number of bit errors in a particular time interval, etc., according to an embodiment. In other embodiments, the EC encoder/decoder 364 is omitted or the EC encoder/decoder 364 is not configured to output bit error information such as one or both of a bit error rate and a number of bit errors in a particular time interval.

The EC encoders/decoders 364 are similar to the EC encoders/decoders 244, in some embodiments.

Although the EC encoder/decoder 364 is illustrated as being a component of the transceiver 308, in some embodiments the EC encoder/decoder 364 is separate from the transceiver 308.

Each of at least some of the transceivers 308 also includes an FEC encoder/decoder 368 that is configured to perform FEC encoding and decoding of packets to be transmitted or received via the port 116. In an embodiment, the FEC encoder/decoder 368 includes a suitable FEC encoder such as an LDPC encoder, an RS encoder, or another suitable FEC encoder, and a suitable FEC decoder such as an LDPC decoder, a RS decoder, or another suitable FEC decoder. The encoder/decoder 368 is configured to generate error information regarding packets received via the port 116, such as one of or any suitable combination of two or more of i) an indicator of an uncorrectable codeword, ii) an uncorrectable codeword error rate, iii) a number of uncorrectable codewords in a particular time interval, iv) a number of bit errors in a codeword, v) a bit error rate, vi) a number of bit errors in a particular time interval, etc., according to an embodiment. In other embodiments, the FEC encoder/decoder 368 is omitted.

The FEC encoders/decoders 368 are similar to the FEC encoders/decoders 260, in some embodiments.

Although the FEC encoder/decoder 368 is illustrated as being a component of the transceiver 308, in some embodiments the FEC encoder/decoder 368 is separate from the transceiver 308.

The clock 144 includes clock synchronization circuitry 380 that is configured to synchronize the clock 144 with a global time. In an embodiment, the clock synchronization circuitry 380 is configured to receive an initial global time reference from a network switch (e.g., the network switch 104, the network switch 200, or another suitable network switch) via the communication interface 304, and to use initial global time reference to adjust the clock 144 so that the time maintained by the clock 144 corresponds to the global time. In some embodiments, the clock synchronization circuitry 380 is configured to, after the clock 144 is initialized and to maintain synchronization, receive further global time references from the network switch, and to use the further global time references to adjust (if necessary) the time maintained by the clock 144 so that the clock 144 remains synchronized to the global time. In some embodiments, the clock synchronization circuitry 380 is configured to receive the further global time references from the network switch periodically.

In other embodiments, the clock synchronization circuitry 380 receives the initial global time reference and the further global time references from the network switch via another communication interface (not shown in FIGS. 1 and 3) of the PHY processor 300 different from the communication interface 304.

In other embodiments, the clock synchronization circuitry 380 is configured to receive the initial global time reference from a host processor (e.g., the host processor 196) and to use the initial global time reference to adjust the clock 144 so that the time maintained by the clock 144 corresponds to the global time. In some embodiments, the clock synchronization circuitry 380 is configured to, after the clock 144 is initialized and to maintain synchronization, receive further global time references from the host processor, and to use the further global time references to adjust (if necessary) the time maintained by the clock 144 so that the clock 144 remains synchronized to the global time. In some embodiments, the clock synchronization circuitry 380 is configured to receive the further global time references from the host periodically.

In some embodiments, the clock synchronization circuitry 380 receives the initial global time reference and the further global time references from the host processor via the communication interface 304. In other embodiments, the clock synchronization circuitry 380 receives the initial global time reference and the further global time references from the host processor via one or more of the ports 116. In other embodiments, the clock synchronization circuitry 380 receives the initial global time reference and the further global time references via another communication interface (not shown in FIGS. 1 and 3) of the PHY processor 300 different from the communication interface 304 and different from the ports 116.

In some embodiments, the clock synchronization circuitry 380 is configured to operate according to the PTP to synchronize the clock 144 to the global time. In other embodiments, the clock synchronization circuitry 380 is configured to operate according to the IEEE 802.1AS Standard to synchronize the clock 144 to the global time. In other embodiments, the clock synchronization circuitry 380 is configured to operate according to the NTP to synchronize the clock 144 to the global time. In other embodiments, the clock synchronization circuitry 380 is configured to operate according to another suitable time synchronization protocol, such as a proprietary protocol, to synchronize the clock 144 to the global time. In some embodiments in which the clock synchronization circuitry 380 operates according to a suitable time synchronization protocol (e.g., PTP, IEEE 802.1AS, NTP, a proprietary protocol, etc.) to synchronize the clock 144 to the global time, the clock synchronization circuitry 380 is configured to exchange timing messages with another device such as a master source of time, as specified by the time synchronization protocol. In some embodiments, the PHY processor 300 periodically receives timing messages from the master source of time, which include respective current times of the global time, and the clock synchronization circuitry 380 uses the current times of the global time to adjust the clock 144 so that the clock 144 is synchronized with the global time.

In some embodiments, the PHY processor 300 receives the time synchronization protocol timing messages via the communication interface 304. In some embodiments, the PHY processor 300 receives the time synchronization protocol timing messages via one or more of the ports 116. In other embodiments, the PHY processor 300 receives the time synchronization protocol timing messages via another communication interface (not shown in FIGS. 1 and 3) of the PHY processor 300 different from the communication interface 304 and the ports 116.

Although the clock synchronization circuitry 380 is illustrated as being a component of the clock 144, in some embodiments the clock synchronization circuitry 380 is a component of other element of the PHY processor 300, such as the DCA 184, a controller of the PHY processor 300 (not shown), or some other suitable element of the PHY processor 300 (including elements not shown in FIG. 3).

The DCA 184 is configured to collect i) raw error detection data from a) the temperature sensor 332 (when included), b) the power supply sensor 336 (when included), c) the signal sensor(s) 340 (when included), d) the EC encoder(s)/decoder(s) 344 (when included), e) the FEC error encoder(s)/decoder(s) 348 (when included), f) the signal sensor(s) 360 (when included), g) the EC encoder(s)/decoder(s) 364 (when included), and h) the FEC error encoder(s)/decoder(s) 368 (when included), and ii) raw time data measured by the clock 144 that indicates times corresponding to the raw error detection data collected by the DCA 184, as discussed above. The DCA 184 is also configured to generate one of or any suitable combination of two or more of: i) sensor information that corresponds to the raw sensor data, ii) optionally error detection information that corresponds to the raw error detection data, and iii) time information corresponding to the raw time data and the global time reference, as discussed above.

The DCA 184 includes a memory 392 that is configured to store one of or any suitable combination of two or more of: i) raw sensor data, ii) raw error detection data, iii) error detection information generated by the DCA 184 using the raw error detection data, iv) sensor information generated by the DCA 184 using the raw sensor data, and v) time information corresponding to the raw time data and the global time reference, as discussed above.

As discussed above, in some embodiments the DCA 184 is configured to collect data from one error detector/sensor in response to an event detected by another detector/sensor. As an illustrative example, in response to an output of a sensor meeting a threshold (e.g., a temperature measured by the temperature sensor 332 meeting a threshold, an SNR measured by a signal sensor 340 meeting a threshold, an SNR measured by a signal sensor 360 meeting a threshold, a power supply voltage level measured by the power supply sensor 336 falling below a threshold, etc.), the DCA 184 collects error detection data from an error detector (e.g., a count of bit errors by an EC encoder/decoder 344 over a time interval, a bit error rate determined by the EC encoder/decoder 344, a count of bit errors by an EC encoder/decoder 364 over a time interval, a bit error rate determined by the EC encoder/decoder 364, a count of uncorrectable codewords by the FEC error encoder/decoder 348 over the time interval, a rate of uncorrectable codewords determined by the FEC error encoder/decoder 348, a count of uncorrectable codewords by one of the FEC error encoders/decoders 368 over the time interval, a rate of uncorrectable codewords determined by one of the FEC error encoders/decoders 368, etc.), according to an embodiment. As another illustrative example, in response to an output of an error detector meeting a threshold (e.g., a count of bit errors determined by the EC encoder/decoder 344 over a time interval meeting a threshold, a bit error rate determined by the EC encoder/decoder 344 meeting a threshold, a count of bit errors determined by one of the EC encoders/decoders 364 over a time interval meeting a threshold, a bit error rate determined by one of the EC encoders/decoders 364 meeting a threshold, a count of uncorrectable codewords determined by the FEC error encoder/decoder 348 over the time interval meeting a threshold, a rate of uncorrectable codewords determined by the FEC error encoder/decoder 348 meeting a threshold, a count of uncorrectable codewords determined by one of the FEC error encoders/decoders 368 over the time interval meeting a threshold, a rate of uncorrectable codewords determined by one of the FEC error encoders/decoders 368 meeting a threshold, etc.), the DCA 184 collects sensor data from a sensor (e.g., a temperature measured by the temperature sensor 332, values of temperature measured by the temperature sensor 332 during a time interval, an SNR measured by one of the signal sensors 340, values of the SNR measured by one of the signal sensors 340 over a time interval, an SNR measured by one of the signal sensors 360, values of the SNR measured by one of the signal sensors 360 over a time interval, a power supply voltage level measured by the power supply sensor 336, values of the power supply voltage level measured by the power supply sensor 336 over a time interval, etc.), according to an embodiment.

Figure 4:
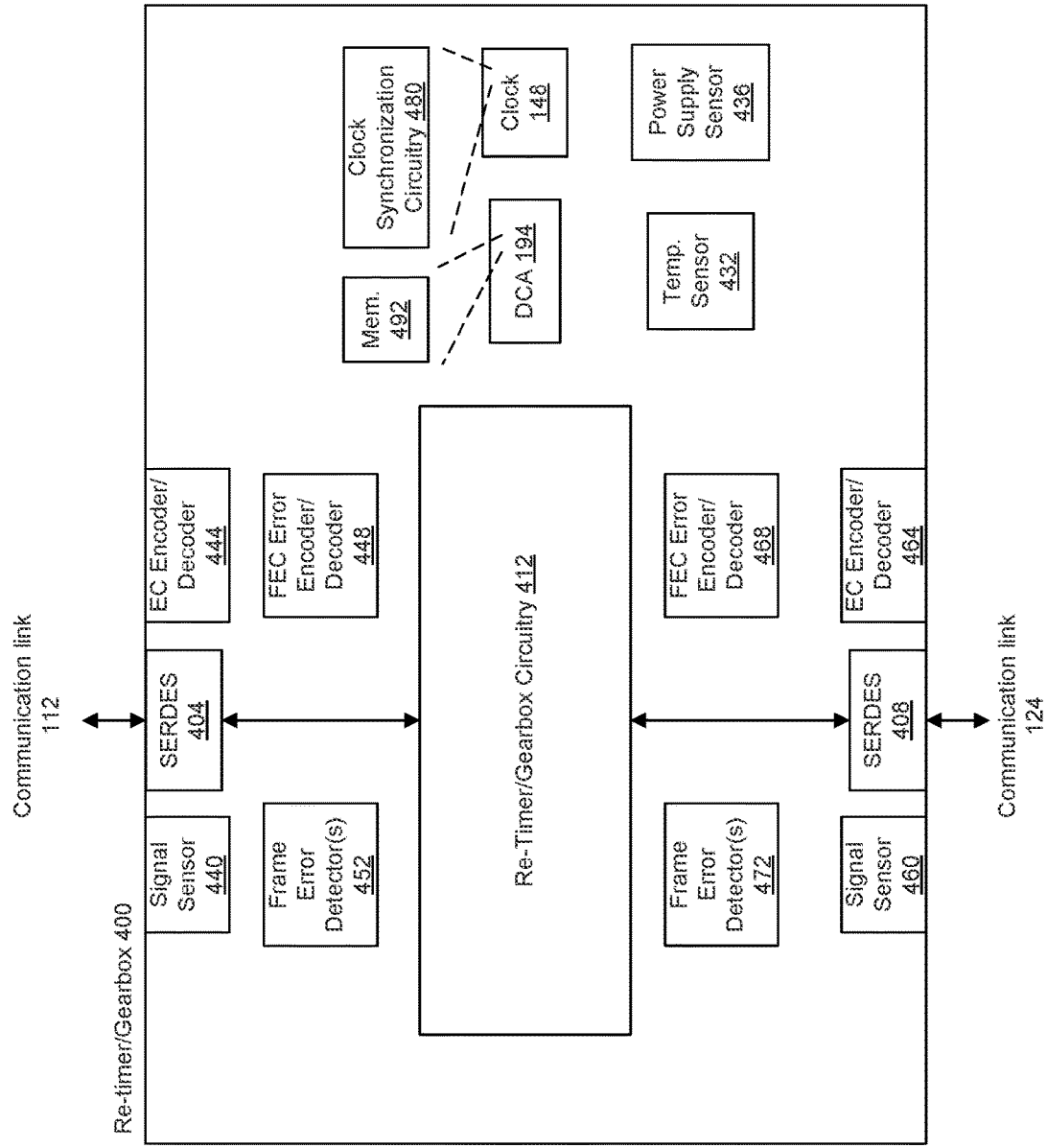
FIG. 4 is a simplified diagram of example re-timer and/or gearbox circuitry of the network device of FIG. 1, according to an embodiment.

FIG. 4 is a simplified diagram of an example re-timer/gearbox 400, according to an embodiment. The re-timer/gearbox 400 is used in the example network device 100 for the re-timer/gearbox 120, in an embodiment. The re-timer/gearbox 400 is described with reference to FIG. 1 for ease of explanation, and like-numbered elements are not described in detail for brevity. In other embodiments, the re-timer/gearbox 120 is a suitable re-timer/gearbox different than the re-timer/gearbox 400 of FIG. 4. In some embodiments, the re-timer/gearbox 400 is included in another suitable network device different than the network device 100 of FIG. 1.

The re-timer/gearbox 400 is configured to couple to a network switch (e.g., the network switch 104) via a first communication link (e.g., the communication link 112) of a network device, and to couple to a transceiver set (e.g., the PHY processor 108) via a second communication link (e.g., the communication link 124). In some embodiments, the first communication link 112 comprises a first serial communication link and/or the second communication link 124 comprises a second serial communication link. In some embodiments, the first communication link 112 includes a first plurality of lanes and the second communication link 124 includes a second plurality of lanes. In some embodiments, the first plurality of lanes includes a same quantity of lanes as included in the second plurality of lanes, whereas in other embodiments the first plurality of lanes includes a different quantity of lanes than included in the second plurality of lanes.

In an embodiment, the first communication link 112 comprises a first serial communication link and the second communication link 124 comprises a second serial communication link. In some such embodiments, the re-timer/gearbox 400 includes a first SERDES 404 configured to couple to the first serial communication link 112 and a second SERDES 408 configured to couple to the second serial communication link 24.

The SERDES 404 is configured to transmit to and receive packets from the network switch 104 via the first serial communication link 112 and the SERDES 408 is configured to transmit to and receive packets from a PHY processor 108 via the second serial communication link 124, in an embodiment.

The re-timer/gearbox 400 includes re-timer/gearbox circuitry 412. In an embodiment, the re-timer/gearbox circuitry 412 includes re-timer circuitry that is configured to receive a first signal via the first SERDES 404, extract data from the first signal, regenerate the first signal using the extracted data, and then provide the regenerated first signal to the second SERDES 408; and timer/gearbox circuitry 412 is configured to receive a second signal via the second SERDES 408, extract data from the second signal, regenerate the second signal using the extracted data, and then provide the regenerated second signal to the first SERDES 404. Additionally or alternatively, the re-timer/gearbox circuitry 412 includes gearbox circuitry that is configured to convert data that is received via a first quantity of lanes for transmission via a second quantity of lanes, and vice versa.

The re-timer/gearbox 400 includes a temperature sensor 432 that is configured to measure a temperature of an IC chip (e.g., the IC chip 190) on which the re-timer/gearbox 400 is at least partially implemented, according to an embodiment. In another embodiment, the temperature sensor 432 is omitted.

The re-timer/gearbox 400 also includes a power supply sensor 436 that is configured to measure one or more physical characteristics (e.g., a voltage level) of a power supply signal of the re-timer/gearbox 400, according to an embodiment. In another embodiment, the power supply sensor 436 is omitted.

The re-timer/gearbox 400 also includes one or more signal sensors 440 that are configured to measure one or more physical characteristics (e.g., an SNR, an SINR, a voltage amplitude, a power level, etc.) of one or more signals on the communication link 112. In an embodiment, the re-timer/gearbox 400 includes a respective signal sensor 440 for each lane of the communication link 112. In another embodiment, the signals sensor(s) 440 are omitted.

The re-timer/gearbox 400 also includes one or more EC encoders/decoders 444 that are configured to perform EC encoding and decoding of transmit and receive signals corresponding to the communication link 112. In an embodiment, each of one or more of the EC encoders/decoders 444 includes a convolutional code encoder such as a Trellis encoder or another suitable convolutional code encoder and a convolutional code decoder such as a Viterbi decoder or another suitable convolutional code decoder. In other embodiments, the one or more of the EC encoders/decoders 444 includes another suitable EC encoder and another suitable EC decoder. The EC encoders/decoders 444 are configured to generate bit error information regarding signals received via the communication link 112, such as a bit error rate, a number of bit errors in a particular time interval, etc., according to an embodiment. In other embodiments, the EC encoder/decoder 244 is omitted or the EC encoder/decoder 444 is not configured to output bit error information such as one or both of a bit error rate and a number of bit errors in a particular time interval.

The EC encoders/decoders 444 are similar to the EC encoders/decoders 244, in some embodiments.

The re-timer/gearbox 400 also includes one or more FEC encoders/decoders 448 that are configured to perform FEC encoding and decoding of packets to be transmitted or received via the communication link 112. In an embodiment, each of one or more of the FEC encoders/decoders 448 includes a suitable FEC encoder such as an LDPC encoder, an RS encoder, or another suitable FEC encoder, and a suitable FEC decoder such as an LDPC decoder, an RS decoder, or another suitable FEC decoder. The one or more FEC encoders/decoders 448 are configured to generate error information regarding packets received via the communication link 112, such as one of or any suitable combination of two or more of i) an indicator of an uncorrectable codeword, ii) an uncorrectable codeword error rate, ili) a number of uncorrectable code words in a particular time interval, iv) a number of bit errors in a codeword, v) a bit error rate, vi) a number of bit errors in a particular time interval, etc., according to an embodiment. In other embodiments, the one or more FEC encoders/decoders 448 are omitted.

The FEC encoders/decoders 448 are similar to the FEC encoders/decoders 260, in some embodiments.

The re-timer/gearbox 400 also includes one or more frame error detectors 452 that are configured to detect frame (or packet) errors corresponding to packets received via the communication link 112. The one or more frame error detectors 452 are configured to generate one of or any suitable combination of two or more of i) an indicator a frame error corresponding to a packet received via the communication link 112, ii) a rate of frame errors corresponding to packets received via the communication link 112, iii) an indicator of a number of frame errors corresponding to packets received via the communication link 112 in a particular time interval, etc., according to an embodiment. In some scenarios, a frame includes one or more FEC codewords, and at least one uncorrectable FEC codeword in the frame results in a frame error. In other scenarios, a single FEC codeword spans multiple frames, and an uncorrectable FEC codeword results in multiple frame errors. In some embodiments, the frame error detector comprises a bit error detector (e.g., a CRC error detector or another suitable bit error detector) that is configured to generate an indicator of at least one bit error in a frame received by the re-timer/gearbox 400 via the communication link 112. In an embodiment, when the bit error detector detects at least one bit error in a frame after an FEC decoder 448 processes one or more codewords corresponding to the frame (i.e., the FEC decoder 448 was unable to correct one or more errors in the one or more codewords), a frame error is detected.

The frame error detectors 452 are similar to the frame error detectors 264, in some embodiments.

The re-timer/gearbox 400 also includes one or more signal sensors 460 that are configured to measure one or more physical characteristics (e.g., an SNR, an SINR, a voltage amplitude, a power level, etc.) of one or more signals on the communication link 124. In an embodiment, the re-timer/gearbox 400 includes a respective signal sensor 460 for each lane of the communication link 124. In another embodiment, the signals sensor(s) 460 are omitted.

The re-timer/gearbox 400 also includes one or more EC encoders/decoders 464 that are configured to perform EC encoding and decoding of transmit and receive signals corresponding to the communication link 124. In an embodiment, each of one or more of the EC encoders/decoders 464 includes a convolutional code encoder such as a Trellis encoder or another suitable convolutional code encoder and a convolutional code decoder such as a Viterbi decoder or another suitable convolutional code decoder. In other embodiments, the one or more of the EC encoders/decoders 464 includes another suitable EC encoder and another suitable EC decoder. The EC encoders/decoders 464 are configured to generate bit error information regarding signals received via the communication link 124, such as a bit error rate, a number of bit errors in a particular time interval, etc., according to an embodiment. In other embodiments, the EC encoder/decoder 264 is omitted or the EC encoder/decoder 464 is not configured to output bit error information such as one or both of a bit error rate and a number of bit errors in a particular time interval.

The EC encoders/decoders 464 are similar to the EC encoders/decoders 244, in some embodiments.

The re-timer/gearbox 400 also includes one or more FEC encoders/decoders 468 that are configured to perform FEC encoding and decoding of packets to be transmitted or received via the communication link 124. In an embodiment, each of one or more of the FEC encoders/decoders 468 includes a suitable FEC encoder such as an LDPC encoder, an RS encoder, or another suitable FEC encoder, and a suitable FEC decoder such as an LDPC decoder, an RS decoder, or another suitable FEC decoder. The one or more FEC encoders/decoders 468 are configured to generate error information regarding packets received via the communication link 124, such as one of or any suitable combination of two or more of i) an indicator of an uncorrectable codeword, ii) an uncorrectable codeword error rate, iii) a number of uncorrectable code words in a particular time interval, iv) a number of bit errors in a codeword, v) a bit error rate, vi) a number of bit errors in a particular time interval, etc., according to an embodiment. In other embodiments, the one or more FEC encoders/decoders 468 are omitted.

The FEC encoders/decoders 468 are similar to the FEC encoders/decoders 260, in some embodiments.

The re-timer/gearbox 400 also includes one or more frame error detectors 472 that are configured to detect frame (or packet) errors corresponding to packets received via the communication link 124. The one or more frame error detectors 472 are configured to generate one of or any suitable combination of two or more of i) an indicator a frame error corresponding to a packet received via the communication link 124, ii) a rate of frame errors corresponding to packets received via the communication link 124, iii) an indicator of a number of frame errors corresponding to packets received via the communication link 124 in a particular time interval, etc., according to an embodiment. In some scenarios, a frame includes one or more FEC codewords, and at least one uncorrectable FEC codeword in the frame results in a frame error. In other scenarios, a single FEC codeword spans multiple frames, and an uncorrectable FEC codeword results in multiple frame errors. In some embodiments, the frame error detector comprises a bit error detector (e.g., a CRC error detector or another suitable bit error detector) that is configured to generate an indicator of at least one bit error in a frame received by the re-timer/gearbox 400 via the communication link 124. In an embodiment, when the bit error detector detects at least one bit error in a frame after an FEC decoder 468 processes one or more codewords corresponding to the frame (i.e., the FEC decoder 468 was unable to correct one or more errors in the one or more codewords), a frame error is detected.

The frame error detectors 472 are similar to the frame error detectors 264, in some embodiments.

The clock 148 includes clock synchronization circuitry 480 that is configured to synchronize the clock 148 with a global time. In an embodiment, the clock synchronization circuitry 480 is configured to receive an initial global time reference from a network switch (e.g., the network switch 104, the network switch 200, etc.) and to use the initial global time reference to adjust the clock 148 so that the time maintained by the clock 148 corresponds to the global time. In some embodiments, the clock synchronization circuitry 480 is configured to, after the clock 148 is initialized and to maintain synchronization, receive further global time references from the network switch, and to use the further global time references to adjust (if necessary) the time maintained by the clock 148 so that the clock 148 remains synchronized to the global time. In some embodiments, the clock synchronization circuitry 480 is configured to receive the further global time references from the host periodically.

In some embodiments, the clock synchronization circuitry 480 receives the initial global time reference and the further global time references from the network switch via the SERDES 404. In other embodiments, the clock synchronization circuitry 480 receives the initial global time reference and the further global time references via another communication interface (not shown in FIGS. 1 and 4) of the re-timer/gearbox 400 different from the SERDES 400.

In another embodiment, the clock synchronization circuitry 480 is configured to receive an initial global time reference from a host processor (e.g., the host processor 196) and to use the initial global time reference to adjust the clock 148 so that the time maintained by the clock 148 corresponds to the global time. In some embodiments, the clock synchronization circuitry 480 is configured to, after the clock 148 is initialized and to maintain synchronization, receive further global time references from the host processor, and to use the further global time references to adjust (if necessary) the time maintained by the clock 148 so that the clock 148 remains synchronized to the global time. In some embodiments, the clock synchronization circuitry 480 is configured to receive the further global time references from the host periodically.

In some embodiments, the clock synchronization circuitry 480 receives the initial global time reference and the further global time references from the host processor via the SERDES 404. In other embodiments, the clock synchronization circuitry 480 receives the initial global time reference and the further global time references from the host processor via the SERDES 408. In other embodiments, the clock synchronization circuitry 480 receives the initial global time reference and the further global time references via another communication interface (not shown in FIGS. 1 and 4) of the re-timer/gearbox 400 different from the SERDES 404 and the SERDES 408.

In some embodiments, the clock synchronization circuitry 480 is configured to operate according to the PTP to synchronize the clock 148 to the global time. In other embodiments, the clock synchronization circuitry 480 is configured to operate according to the IEEE 802.1AS Standard to synchronize the clock 148 to the global time. In other embodiments, the clock synchronization circuitry 480 is configured to operate according to the NTP to synchronize the clock 148 to the global time. In other embodiments, the clock synchronization circuitry 480 is configured to operate according to another suitable time synchronization protocol, such as a proprietary protocol, to synchronize the clock 148 to the global time. In some embodiments in which the clock synchronization circuitry 480 operates according to a suitable time synchronization protocol (e.g., PTP, IEEE 802.1AS, NTP, a proprietary protocol, etc.) to synchronize the clock 148 to the global time, the clock synchronization circuitry 480 is configured to exchange timing messages with another device such as a master source of time, as specified by the time synchronization protocol. In some embodiments, the re-timer/gearbox 400 periodically receives timing messages from the master source of time, which include respective current times of the global time, and the clock synchronization circuitry 480 uses the current times of the global time to adjust the clock 148 so that the clock 148 is synchronized with the global time.

In some embodiments, the re-timer/gearbox 400 receives the time synchronization protocol timing messages via the SERDES 404. In some embodiments, the re-timer/gearbox 400 receives the time synchronization protocol timing messages via the SERDES 408. In other embodiments, the re-timer/gearbox 400 receives the time synchronization protocol timing messages via another communication interface (not shown in FIGS. 1 and 4) of the re-timer/gearbox 400 different from the SERDES 404 and the SERDES 408.

Although the clock synchronization circuitry 480 is illustrated as being a component of the clock 148, in some embodiments the clock synchronization circuitry 480 is a component of other element of the re-timer/gearbox 400, such as the DCA 194, a controller of the re-timer/gearbox 400 (not shown), or some other suitable element of the re-timer/gearbox 400 (including elements not shown in FIG. 4).

The DCA 194 is configured to collect i) raw error detection data from a) the temperature sensor 432 (when included), b) the power supply sensor 436 (when included), c) the signal sensor(s) 440 (when included), d) the EC encoder(s)/decoder(s) 444 (when included), e) the FEC error encoder(s)/decoder(s) 448 (when included), f) the frame error detector 452 (when included), g) the signal sensor(s) 460 (when included), h) the EC encoder(s)/decoder(s) 464 (when included), i) the FEC error encoder(s)/decoder(s) 468 (when included), and j) the frame error detector 472 (when included), and ii) raw time data measured by the clock 148 that indicates times corresponding to the raw error detection data collected by the DCA 194, as discussed above. The DCA 194 is also configured to generate one of or any suitable combination of two or more of: i) sensor information that corresponds to the raw sensor data, ii) optionally error detection information that corresponds to the raw error detection data, and iii) time information corresponding to the raw time data and the global time reference, as discussed above.

The DCA 194 includes a memory 492 that is configured to store one of or any suitable combination of two or more of: i) raw sensor data, ii) raw error detection data, iii) error detection information generated by the DCA 194 using the raw error detection data, iv) sensor information generated by the DCA 194 using the raw sensor data, and v) time information corresponding to the raw time data and the global time reference, as discussed above.

As discussed above, in some embodiments the DCA 194 is configured to collect data from one error detector/sensor in response to an event detected by another detector/sensor. As an illustrative example, in response to an output of a sensor meeting a threshold (e.g., a temperature measured by the temperature sensor 432 meeting a threshold, an SNR measured by a signal sensor 440 meeting a threshold, an SNR measured by a signal sensor 460 meeting a threshold, a power supply voltage level measured by the power supply sensor 436 falling below a threshold, etc.), the DCA 194 collects error detection data from an error detector (e.g., a count of bit errors by an EC encoder/decoder 444 over a time interval, a bit error rate determined by the EC encoder/decoder 444, a count of bit errors by an EC encoder/decoder 464 over a time interval, a bit error rate determined by the EC encoder/decoder 464, a count of uncorrectable codewords by the FEC error encoder/decoder 348 over the time interval, a rate of uncorrectable codewords determined by the FEC error encoder/decoder 448, a count of uncorrectable codewords by one of the FEC error encoders/decoders 468 over the time interval, a rate of uncorrectable codewords determined by one of the FEC error encoders/decoders 468, etc.), according to an embodiment. As another illustrative example, in response to an output of an error detector meeting a threshold (e.g., a count of bit errors determined by the EC encoder/decoder 444 over a time interval meeting a threshold, a bit error rate determined by the EC encoder/decoder 444 meeting a threshold, a count of bit errors determined by one of the EC encoders/decoders 464 over a time interval meeting a threshold, a bit error rate determined by one of the EC encoders/decoders 464 meeting a threshold, a count of uncorrectable codewords determined by the FEC error encoder/decoder 448 over the time interval meeting a threshold, a rate of uncorrectable codewords determined by the FEC error encoder/decoder 448 meeting a threshold, a count of uncorrectable codewords determined by one of the FEC error encoders/decoders 468 over the time interval meeting a threshold, a rate of uncorrectable codewords determined by one of the FEC error encoders/decoders 368 meeting a threshold, etc.), the DCA 194 collects sensor data from a sensor (e.g., a temperature measured by the temperature sensor 432, values of temperature measured by the temperature sensor 432 during a time interval, an SNR measured by one of the signal sensors 440, values of the SNR measured by one of the signal sensors 440 over a time interval, an SNR measured by one of the signal sensors 460, values of the SNR measured by one of the signal sensors 460 over a time interval, a power supply voltage level measured by the power supply sensor 436, values of the power supply voltage level measured by the power supply sensor 436 over a time interval, etc.), according to an embodiment.

As discussed above, DCAs such as described above (e.g., one or more of the DCA 168, DCA 184, the DCA 194, or another suitable DCA) are configured to coordinate the collection of sensor data and/or error detection data from sensors and/or error detectors communicatively coupled to the DCA. Also as discussed above, DCAs such as described above are configured to process raw sensor data and/or raw error detection data to generate sensor information and/or error detection information such as described above. In some embodiments, generating sensor information and/or error detection information comprises compressing raw sensor data and/or raw error detection data. In some embodiments, generating sensor information and/or error detection information additionally or alternatively comprises filtering raw sensor data and/or raw error detection data. In some embodiments, generating sensor information and/or error detection information additionally or alternatively comprises generating figure of merit (FOM) information using raw sensor data and/or raw error detection data.

The generation of sensor information and/or error detection information by compressing and/or filtering, and/or the generation of FOM information, facilitates reducing an amount of memory (e.g., the memory 292, the memory 392, the memory 492, or one or more other suitable memories) needed to store the sensor information, the error detection information, and/or the FOM information, in some embodiments. The generation of sensor information and/or error detection information by compressing and/or filtering, and/or the generation of FOM information, facilitates reducing an amount of information (sensor information, error detection information, and/or FOM information) sent to a host processor (e.g., the host processor 196 or another suitable host processor) by the DCA, in some embodiments.

FIG. 5A is a diagram of an example data structure 500 that the DCA 184 of the PHY processor 108/300 is configured to generate and store in the memory 392, according to an embodiment. In some embodiments, the DCA 184 is also configured to transmit the data structure 500, or information included in the data structure 500, to the host processor 196 and/or another suitable host processor.

The data structure 500 includes a first entry 504 corresponding to sensor information and a second entry 508 corresponding to error detection information. The first entry 504 includes: a field 512 that indicates a sensor-related event (e.g., an SNR has fallen below a threshold); and a field 516 that indicates a time, as measured by the clock 144, corresponding to the event indicated in the field 512. The first entry 504 also includes a field 520 that indicates a sensor (e.g., sensor Z) that corresponds to the event indicated in the field 512. In some embodiments, the field 520 also indicates a device (e.g., transceiver set Y) and/or a system (e.g., system X) in which the sensor is located.

The second entry 508 includes: a field 532 that indicates an error detector-related event (e.g., a bit error rate (BER) has risen above a threshold); and a field 536 that indicates a time, as measured by the clock 144, corresponding to the event indicated in the field 532. The second entry 508 also includes a field 540 that indicates an error detector (e.g., error detector Z) that corresponds to the event indicated in the field 532. In some embodiments, the field 540 also indicates a device (e.g., transceiver set Y) and/or a system (e.g., system X) in which the error detector is located.

The event indicated by the first entry 504 may be related to the event indicated by the second entry 508. For example, the drop in SNR indicted by the first entry 504 resulted in the increase in BER indicated by the second entry 508.

The time information in the field 516 and in the field 536 may facilitate correlating the event indicated by the first entry 504 and the event indicated by the second entry 508 in time. For example, the respective times at which the SNR fell below a first threshold and the BER rose above a second threshold are separated by a time difference of Delta1, which may indicate the two events are related.

FIG. 5B is a diagram of another example data structure 550 that the DCA 168 is configured to generate and store in the memory 292, according to an embodiment. In some embodiments, the DCA 168 is also configured to transmit the data structure 550, or information included in the data structure 550, to the host processor 196 and/or another suitable host processor.

The data structure 550 includes an entry 554 corresponding to error detection information. The entry 554 includes: a field 562 that indicates an error detection-related event (e.g., an uncorrectable FEC codeword detected); and a field 566 that indicates a time, as measured by the clock 140, corresponding to the event indicated in the field 562. The entry 554 also includes a field 570 that indicates an error detector (e.g., FEC decoder Z) that corresponds to the event indicated in the field 562. In some embodiments, the field 570 also indicates a device (e.g., switch Y) and/or a system (e.g., system X) in which the error detector is located.

FIG. 5C is a diagram of another example data structure 580 that the DCA 168 is configured to generate and store in the memory 292, according to an embodiment. In some embodiments, the DCA 168 is also configured to transmit the data structure 580, or information included in the data structure 580, to the host processor 196 and/or another suitable host processor.

The data structure 580 includes an entry 584 corresponding to error detection information. The entry 584 includes: a field 588 that indicates an error detection-related event (e.g., a frame error detected); and a field 590 that indicates a time, as measured by the clock 140, corresponding to the event indicated in the field 588. The entry 584 also includes a field 592 that indicates an error detector (e.g., frame error detector Z) that corresponds to the event indicated in the field 562588 In some embodiments, the field 592 also indicates a device (e.g., switch Y) and/or a system (e.g., system X) in which the error detector is located.

Referring now to FIGS. 5A-C, the events indicated by the entries 504, 508, 554, 584 are related to one another. For example, the drop in SNR indicted by the entry 504 resulted in the increase in BER indicated by the entry 508. Additionally, the increase in BER indicated by the second entry 508 resulted in the uncorrectable FEC codeword indicated by the entry 554; and the uncorrectable FEC codeword indicated by the entry 554 resulted in the frame error indicated by the entry 584.

Because the clocks 140 and 144 are synchronized as discussed above, the time information in the fields 516, 536, 566, 590 may facilitate correlating the events indicated by the entries 504, 508, 554, 584 in time. For example, the respective times at which the SNR fell below a first threshold, the BER rose above a second threshold, the uncorrectable FEC codeword was detected, and the frame error was detected, may be relatively close, which may indicate the events are related.

In other embodiments, data structures similar to the data structures 500, 550, 580 omit one or more types of information included in the data structures 500, 550, 580, and/or include one or more other suitable types of information not shown in the data structures 500, 550, 580.

FIG. 6 is a diagram of another example data structure 600 that a host processor (e.g., the host processor 196 or another suitable host processor) is configured to generate using data from the data structures 500, 550, 580 received from the DCA 168 and the DCA 184, according to an embodiment.

The data structure 600 includes entries corresponding to the entries 504, 508, 554, 584 illustrated in FIGS. 5A-C. As discussed above, because the clocks 140 and 144 of the network switch 104/200 and the PHY processor 108/300, respectively, are synchronized, the time information in the fields 516, 536, 566, 590 of the data structures 500, 550, 580 facilitates the host processor in correlating the events indicated by the entries 504, 508, 554, 584 in time. Thus, the host processor generates the data structure 600 to illustrate the time correlation of the events indicated by the entries 504, 508, 554, 584.

In other embodiments, data structures similar to the data structure 600 omit one or more types of information included in the data structure 600, and/or include one or more other suitable types of information not shown in the data structure 600.

Figure 7A:
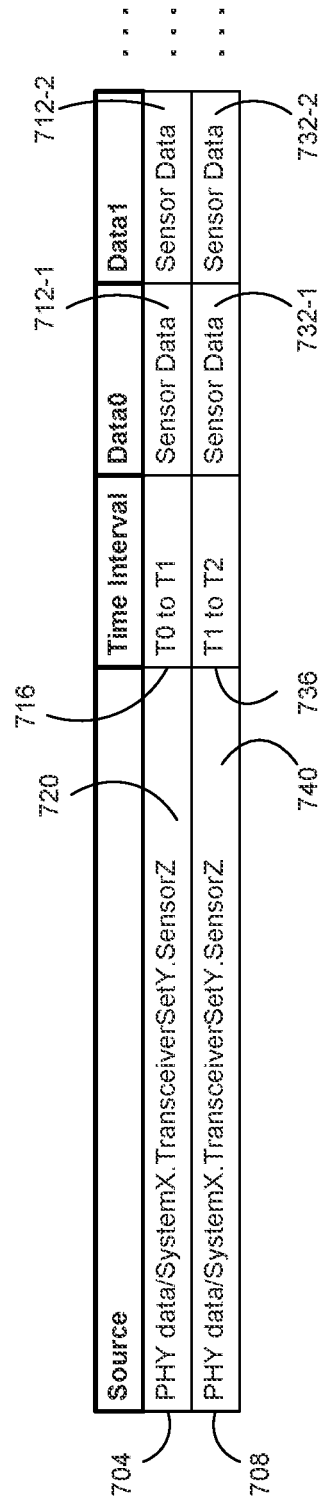
FIGS. 7A-B are diagrams of other example data structures that the network device of FIG. 1 is configured to generate, according to an embodiment.

FIG. 7A is a diagram of another example data structure 700 that the DCA 184 is configured to generate and store in the memory 392, according to an embodiment. In some embodiments, the DCA 184 is also configured to transmit the data structure 700, or information included in the data structure 700, to the host processor 196 and/or another suitable host processor.

The data structure 700 includes a first entry 704 corresponding to first sensor information collected during a first time interval and a second entry 708 corresponding to second sensor information collected during a second time interval. The first entry 704 includes: one or more fields 712 that include sensor information corresponding to the first time interval (e.g., one of or any suitable combination of two or more of: i) a plurality of sensor output values sampled during the first time interval, ii) an average sensor output during the first time interval, iii) a filtered sensor output during the first time interval, iv) a maximum sensor output value during the first time interval, v) a minimum sensor output value during the first time interval, etc.). The first entry 704 also includes a field 716 that indicates the first time interval, as measured by the clock 144 (e.g., i) a start time and an end time, ii) a start time and a duration, iii) an end time and a duration, etc.). The first entry 704 also includes a field 720 that indicates a sensor (e.g., sensor Z) that corresponds to the sensor data in the one or more fields 712. In some embodiments, the field 720 also indicates a device (e.g., transceiver set Y) and/or a system (e.g., system X) in which the sensor is located.

The second entry 708 includes: one or more fields 732 that include sensor information corresponding to the second time interval (e.g., one of or any suitable combination of two or more of: i) a plurality of sensor output values sampled during the second time interval, ii) an average sensor output during the second time interval, iii) a filtered sensor output during the second time interval, iv) a maximum sensor output value during the second time interval, v) a minimum sensor output value during the second time interval, etc.). The second entry 708 also includes a field 736 that indicates the second time interval, as measured by the clock 144 (e.g., i) a start time and an end time, ii) a start time and a duration, iii) an end time and a duration, etc.). The second entry 708 also includes a field 740 that indicates a sensor (e.g., sensor Z) that corresponds to the sensor data in the one or more fields 732. In some embodiments, the field 740 also indicates a device (e.g., transceiver set Y) and/or a system (e.g., system X) in which the sensor is located.

Figure 7B:
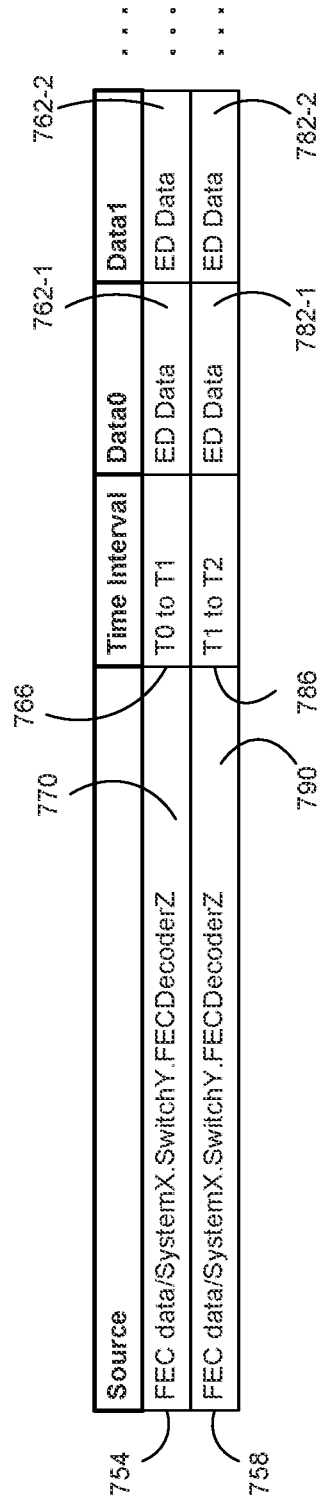

FIG. 7B is a diagram of another example data structure 750 that the DCA 168 is configured to generate and store in the memory 292, according to an embodiment. In some embodiments, the DCA 168 is also configured to transmit the data structure 750, or information included in the data structure 750, to the host processor 196 and/or another suitable host processor.

The data structure 750 includes a first entry 754 corresponding to first error detection information collected during a first time interval and a second entry 758 corresponding to second error detection information collected during a second time interval. The first entry 754 includes: one or more fields 762 that include error detection information corresponding to the first time interval (e.g., one of or any suitable combination of two or more of: i) a plurality of error counts corresponding to a plurality of sub-intervals during the first time interval, ii) a plurality of error rates sampled during the first time interval, ii) an average error rate during the first time interval, iii) a filtered error rate during the first time interval, iv) a maximum error rate during the first time interval, v) a minimum error rate during the first time interval, etc.). The first entry 754 also includes a field 766 that indicates the first time interval, as measured by the clock 140 (e.g., i) a start time and an end time, ii) a start time and a duration, iii) an end time and a duration, etc.). The first entry 754 also includes a field 770 that indicates an error detector (e.g., FEC decoder Z) that corresponds to the error detection data in the one or more fields 762. In some embodiments, the field 770 also indicates a device (e.g., switch Y) and/or a system (e.g., system X) in which the error detector is located.

The second entry 758 includes: one or more fields 782 that include error detection information corresponding to the second time interval (e.g., one of or any suitable combination of two or more of: i) a plurality of error counts corresponding to a plurality of sub-intervals during the second time interval, ii) a plurality of error rates sampled during the second time interval, ii) an average error rate during the second time interval, iii) a filtered error rate during the second time interval, iv) a maximum error rate during the second time interval, v) a minimum error rate during the second time interval, etc.). The second entry 758 also includes a field 786 that indicates the second time interval, as measured by the clock 140 (e.g., i) a start time and an end time, ii) a start time and a duration, iii) an end time and a duration, etc.). The second entry 758 also includes a field 790 that indicates an error detector (e.g., FEC decoder Z) that corresponds to the error detection data in the one or more fields 782. In some embodiments, the field 790 also indicates a device (e.g., switch Y) and/or a system (e.g., system X) in which the error detector is located.

The time information in the fields 716, 736, 766, 786 facilitate correlating the data in the entries 712, 732, 762, 782 in time.

In other embodiments, data structures similar to the data structures 700, 750 omit one or more types of information included in the data structures 700, 750, and/or include one or more other suitable types of information not shown in the data structures 700, 750.

FIG. 8A is a diagram of another example data structure 800 that a host processor (e.g., the host processor 196 or another suitable host processor) is configured to generate using data from the data structures 700, 750, received from the DCA 168 and the DCA 184, according to an embodiment.

The data structure 800 includes entries corresponding to the entries 704, 754 illustrated in FIGS. 7A-B. As discussed above, because the clocks 140 and 144 are synchronized, the time information in the fields 716, 766 of the data structures 700, 750 facilitates the host processor in correlating sensor/error detection data in the entries 704, 754 in time. Thus, the host processor generates the data structure 800 to illustrate the time correlation of the sensor/error detection data in the entries 704, 754.

FIG. 8B is a diagram of another example data structure 850 that a host processor (e.g., the host processor 196 or another suitable host processor) is configured to generate using data from the data structures 700, 750, received from the DCA 168 and the DCA 184, according to an embodiment.

The data structure 850 includes entries corresponding to the entries 708, 758 illustrated in FIGS. 7A-B. As discussed above, because the clocks 140 and 144 are synchronized, the time information in the fields 736, 786 of the data structures 700, 750 facilitates the host processor in correlating sensor/error detection data in the entries 708, 758 in time. Thus, the host processor generates the data structure 850 to illustrate the time correlation of the sensor/error detection data in the entries 704, 754.

In other embodiments, data structures similar to the data structures 800, 850 omit one or more types of information included in the data structures 800, 850, and/or include one or more other suitable types of information not shown in the data structures 800, 850.

FIGS. 5A-C and 7A-B are illustrative examples in which a DCA associates sensor/error detection information with time information measured by a clock that is synchronized with a global time. In other embodiments, a DCA associates sensor/error detection information with time information measured by a clock that is synchronized with a global time in other suitable ways, including ways that do not involve generating data structures having both sensor/error detection information and time information measured by the clock.

As discussed above, sensor/error detection information and associated time information provided to a host processor by DCAs such as described above facilitate the host processor in time-correlating sensor/error detection information from multiple components within a network device and/or within multiple different network devices, at least according to some embodiments. Illustrative examples of time-correlation of sensor/error detection information were described above with reference to FIGS. 6 and 8A-B. In other embodiments, the host processor generates a graph, a plot, a chart, etc., that displays sensor/error detection information from multiple components within a network device and/or within multiple different network devices against a single time axis to visually correlate the sensor/error detection information in time. In other embodiments, the host processor time-correlates sensor/error detection information from multiple components within a network device and/or within multiple different network devices in other suitable ways.

Figure 9:
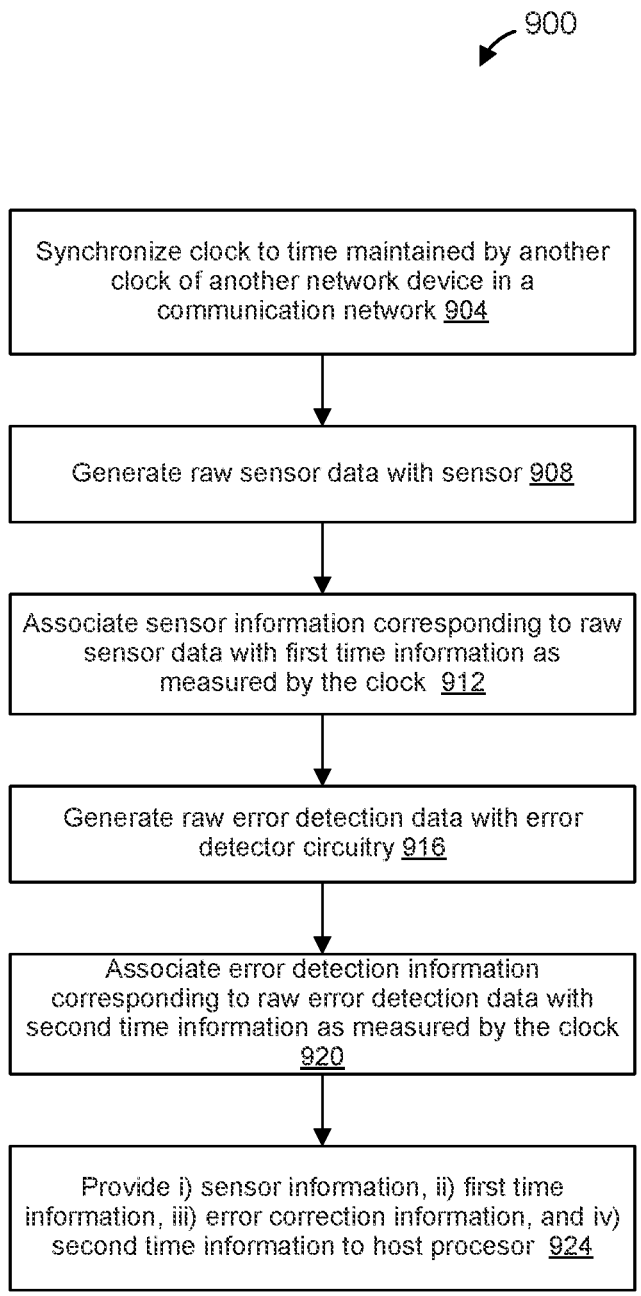
FIG. 9 is a flow diagram of an example method for collecting sensor data and/or error detection data in a communication network, according to an embodiment.

FIG. 9 is a flow diagram of an example method 900 for collecting sensor data and/or error detection data in a communication network, according to an embodiment. The method 900 is implemented by a network device such as the example network device 100 of FIG. 1 or another suitable network device, in an embodiment. The method 900 is implemented by a network switch such as the example network switch 104 of FIG. 1, the example network switch 200 of FIG. 2, or another suitable network switch, in an embodiment. The method 900 is implemented by a transceiver device such as the example PHY processor 108 of FIG. 1, the example PHY processor 300 of FIG. 3, or another suitable transceiver device, in an embodiment. The method 900 is implemented by a re-timer and/or gearbox device such as the example re-timer/gearbox 120 of FIG. 1, the example re-timer/gearbox 400 of FIG. 4, or another suitable re-timer and/or gearbox device, in an embodiment.

In some embodiments, each of multiple network devices (e.g., each of two or more of the network switch 104, the PHY processor 108, and the re-timer/gearbox 120) performs a respective instance of the method 900.

FIG. 9 is described with reference to FIGS. 1-4 for explanatory purposes. In some embodiments, the method 900 is implemented by a suitable component of a communication network that is different than the components illustrated in FIGS. 1-4.

At block 904, a network device synchronizes a clock of the network device to a time maintained by another clock of another network device in a communication network. For example, the clock synchronization circuitry 280 of the network switch 200 synchronizes the clock 140 to a global time as discussed above, according to an embodiment. As another example, the clock synchronization circuitry 380 of the PHY processor 300 synchronizes the clock 144 to the global time and/or to a time maintained by the clock 140 of the network switch 104/200 (which is synchronized to the global time) as discussed above, according to another embodiment. As yet another example, the clock synchronization circuitry 480 of the re-timer/gearbox 400 synchronizes the clock 148 to the global time and/or to the time maintained by the clock 140 of the network switch 104/200 (which is synchronized to the global time) as discussed above, according to another embodiment.

At block 908, a sensor of the network device generates raw sensor data. Generating raw sensor data at block 908 includes a suitable sensor, such as the sensors 156, 172, 188, 232, 236, 240, 332, 336, 340, 360, 432, 436, 440, 460, generating raw sensor data such as described above.

At block 912, the network device associates sensor information corresponding to the raw sensor data generated at block 908 with first time information as measured by the clock. For example, the sensor of the network device (e.g., the sensors 156, 172, 188, 232, 236, 240, 332, 336, 340, 360, 432, 436, 440, 460, etc.) associates the sensor information with first time information as measured by the clock (e.g., the clock 140, the clock 144, the clock 148, etc.), according to an embodiment. As another example, a DCA of the network device (e.g., the DCA 168, the DCA 184, DCA 194, etc.) associates the sensor information with first time information as measured by the clock (e.g., the clock 140, the clock 144, the clock 148, etc.), according to another embodiment.

Associating the sensor information with the first time information at block 912 includes associating a sample of raw sensor data measured by the sensor with a timestamp generated using the clock, in an embodiment. Associating the sensor information with the first time information at block 912 includes associating filtered raw sensor data with a timestamp generated using the clock, in another embodiment. Associating the sensor information with the first time information at block 912 includes associating a plurality of raw sensor data values taken during a time interval measured by the clock with timing information that indicates the time interval, in another embodiment. Associating the sensor information with the first time information at block 912 includes associating filtered raw sensor data generated using raw sensor data generated during a time interval measured by the clock with timing information that indicates the time interval, in another embodiment.

Associating the sensor information with the first time information at block 912 includes associating a performance metric generated using raw sensor data corresponding to a particular time measured by the clock with a timestamp that indicates the particular time, in another embodiment. Associating the sensor information with the first time information at block 912 includes associating a performance metric generated using raw sensor data corresponding to a particular time interval measured by the clock with timing information that indicates the particular time interval, in another embodiment.

Associating the sensor information with the first time information at block 912 includes generating a data structure that associates the sensor information with the first time information, in some embodiments.

At block 916, an error detector of the network device generates raw error detection data. Generating raw error detection data at block 916 includes a suitable error detector, such as the error detectors 164, 180, 192, 244, 260, 264, 344, 348, 364, 368, 444, 448, 452, 464, 468, 472, generating raw error detection data such as described above.

At block 920, the network device associates error detection information corresponding to the raw error detection data generated at block 916 with second time information as measured by the clock. For example, the error detector (e.g., the error detectors 164, 180, 192, 244, 260, 264, 344, 348, 364, 368, 444, 448, 452, 464, 468, 472, etc.) associates the error detection information with second time information as measured by the clock (e.g., the clock 140, the clock 144, the clock 148, etc.), according to an embodiment. As another example, a DCA of the network device (e.g., the DCA 168, the DCA 184, DCA 194, etc.) associates the error detection information with second time information as measured by the clock (e.g., the clock 140, the clock 144, the clock 148, etc.), according to another embodiment.

Associating the error detection information with the second time information at block 920 includes associating a sample of raw error detection data measured by the error detector with a timestamp generated using the clock, in an embodiment. Associating the error detection information with the second time information at block 920 includes associating filtered raw error detection data with a timestamp generated using the clock, in another embodiment. Associating the error detection information with the second time information at block 920 includes associating a plurality of raw error detection data values taken during a time interval measured by the clock with timing information that indicates the time interval, in another embodiment. Associating the error detection information with the second time information at block 920 includes associating filtered raw error detection data generated using raw error detection data generated during a time interval measured by the clock with timing information that indicates the time interval, in another embodiment.

Associating the error detection information with the second time information at block 920 includes associating a performance metric generated using raw error detection data corresponding to a particular time measured by the clock with a timestamp that indicates the particular time, in another embodiment. Associating the error detection information with the second time information at block 920 includes associating a performance metric generated using raw error detection data corresponding to a particular time interval measured by the clock with timing information that indicates the particular time interval, in another embodiment.

Associating the error detection information with the second time information at block 920 includes generating a data structure that associates the error detection information with the second time information, in some embodiments.

At block 924, the network device provides to a host processor (e.g., the host processor 196 or another suitable host processor) i) the sensor information, ii) the first time information that is associated with the sensor information, iii) the error detection information, and iv) the second time information that is associated with the error detection information. In an embodiment, a DCA provides to the host processor i) the sensor information, ii) the first time information that is associated with the sensor information, iii) the error detection information, and iv) the second time information that is associated with the error detection information. Because the clock is synchronized to the time (e.g., a global time) maintained by the other clock of the other network device in the communication network (block 904), the first time information and the second time information facilitate the host processor correlating, according to the time maintained by the other clock, the sensor information and the error detection information with other sensor information and/or other error detection information generated by one or more other network devices that perform other instances of the method 900.

In some embodiments, the method 900 further includes generating one or more data structures that i) associate the sensor information with the first time information, and ii) associate the error detection information with the second time information; and performing block. 924 includes providing the one or more data structures to the host processor. In some embodiments, the one or more data structures have a structure the same as or similar to one or more of the data structures illustrated in FIGS. 5A-C and FIGS. 7A-B. In other embodiments, the one or more data structures have another suitable structure different than the data structures illustrated in FIGS. 5A-C and FIGS. 7A-B. In some embodiments, the one or more data structures include information the same as or similar to information included in one or more of the data structures illustrated in FIGS. 5A-C and FIGS. 7A-B. In some embodiments, the one or more data structures omit information included in one or more of the data structures illustrated in FIGS. 5A-C and FIGS. 7A-B and/or include other information not included in one or more of the data structures illustrated in FIGS. 5A-C and FIGS. 7A-B.

In some embodiments in which the network device includes multiple sensors, blocks 908 and 912 are repeated for each of multiple sensors.

In some embodiments in which the network device includes multiple error detection circuitry, blocks 916 and 920 are repeated for each of multiple error detection circuitry.

In some embodiments, the method 900 omits blocks 908 and 912, and block 924 omits providing to the host processor i) the sensor information, and ii) the first time information that is associated with the sensor information.

In some embodiments, the method 900 omits blocks 916 and 920, and block 924 omits providing to the host processor i) the error detection information, and ii) the second time information that is associated with the error detection information.

Figure 10:
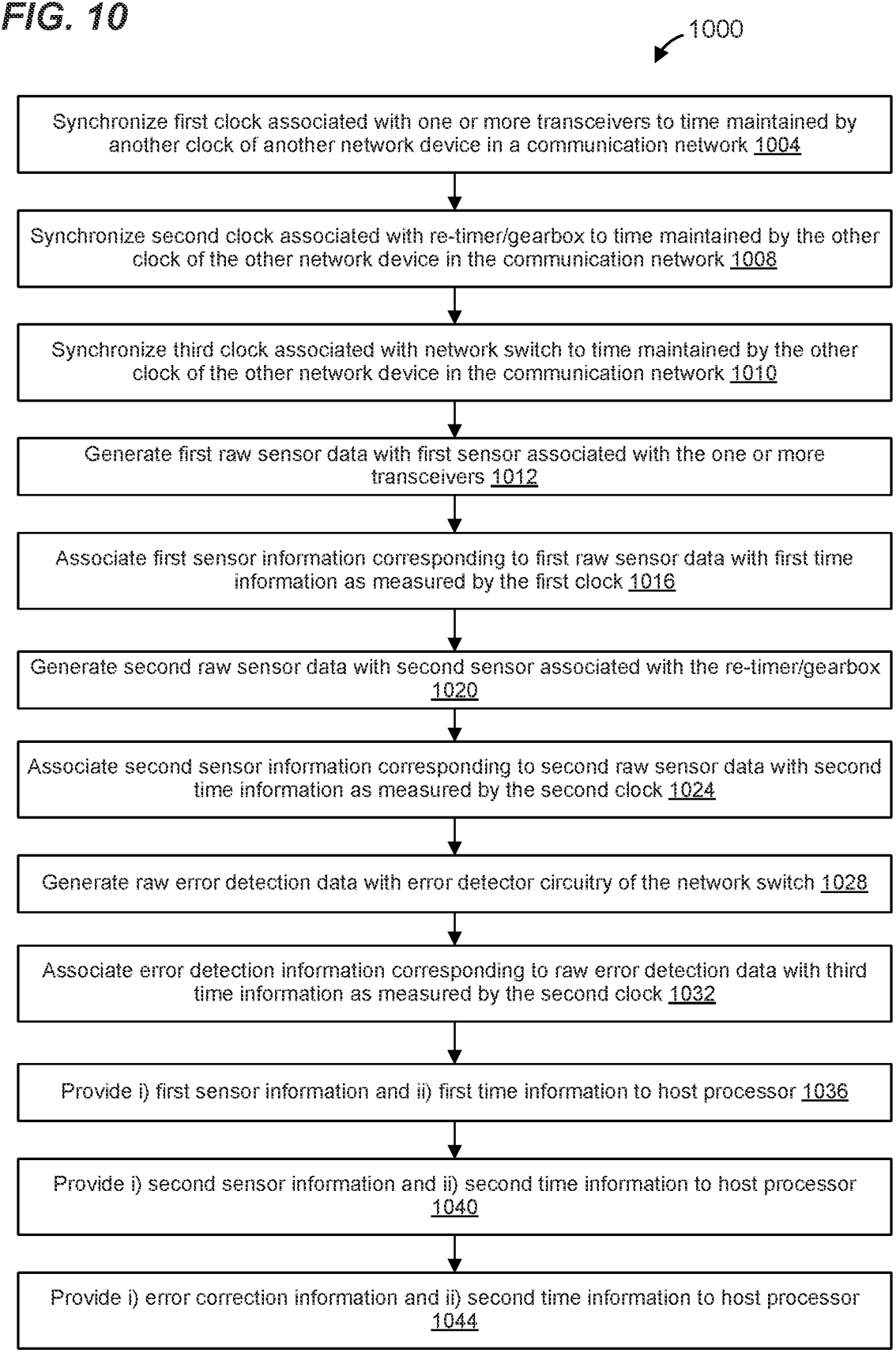
FIG. 10 is a flow diagram of another example method for collecting sensor data and error detection data in a communication network, according to another embodiment.

FIG. 10 is a flow diagram of another example method 1000 for collecting sensor data and error detection data in a communication network, according to another embodiment. The method 1000 is implemented by a network device such as the example network device 100 of FIG. 1, and the method 1000 is described with reference to FIGS. 1-4 for explanatory purposes. In other embodiments, the method 1000 is implemented by another suitable network device different than the network device 100. In some embodiments, the network device 100 implements another suitable method for collecting sensor data and error detection data different than the method 1000.

At block 1004, a network device synchronizes a first clock associated with one or more transceivers of the network device to a time maintained by another clock of another network device in a communication network. For example, the clock synchronization circuitry 380 of the PHY processor 300 synchronizes the clock 144 to the global time and/or to a time maintained by the clock 140 of the network switch 104/200 (which is synchronized to the global time) as discussed above, according to another embodiment.

At block 1008, a network device synchronizes a second clock associated with a re-timer/gearbox of the network device to the time maintained by the other clock of the other network device in the communication network. For example, the clock synchronization circuitry 480 of the re-timer gearbox 400 synchronizes the clock 148 to the global time as discussed above, according to an embodiment.

At block 1008, a network device synchronizes a third clock associated with a network switch of the network device to the time maintained by the other clock of the other network device in the communication network. For example, the clock synchronization circuitry 280 of the network switch 200 synchronizes the clock 140 to the global time as discussed above, according to an embodiment.

At block 1012, a first sensor corresponding to the one or more transceivers generates first raw sensor data. Generating first raw sensor data at block 1012 includes a suitable sensor, such as the sensors 172, 332, 336, 340, 360, generating raw sensor data such as described above.

At block 1016, the network device associates first sensor information corresponding to the first raw sensor data generated at block 1012 with first time information as measured by the first clock. For example, the first sensor (e.g., the sensors 172, 332, 336, 340, 360, etc.) associates the first sensor information with first time information as measured by the first clock (e.g., the clock 144), according to an embodiment. As another example, a DCA associated with the one or more transceivers (e.g., the DCA 184) associates the first sensor information with first time information as measured by the first clock (e.g., the clock 144), according to another embodiment.

Associating the first sensor information with the first time information at block 1016 includes associating a sample of raw sensor data measured by the first sensor with a timestamp generated using the first clock, in an embodiment. Associating the first sensor information with the first time information at block 1016 includes associating filtered raw sensor data with a timestamp generated using the first clock, in another embodiment. Associating the first sensor information with the first time information at block 1016 includes associating a plurality of raw sensor data values taken during a time interval measured by the first clock with timing information that indicates the time interval, in another embodiment. Associating the first sensor information with the first time information at block 1016 includes associating filtered raw sensor data generated using raw sensor data generated during a time interval measured by the first clock with timing information that indicates the time interval, in another embodiment.

Associating the first sensor information with the first time information at block 1016 includes associating a performance metric generated using first raw sensor data corresponding to a particular time measured by the first clock with a timestamp that indicates the particular time, in another embodiment. Associating the first sensor information with the first time information at block 1016 includes associating a performance metric generated using first raw sensor data corresponding to a particular time interval measured by the first clock with timing information that indicates the particular time interval, in another embodiment.

Associating the first sensor information with the first time information at block 1016 includes generating a data structure that associates the first sensor information with the first time information, in some embodiments.

At block 1020, a second sensor corresponding to the re-timer/gearbox generates second raw sensor data. Generating second raw sensor data at block 1020 includes a suitable sensor, such as the sensors 188, 432, 436, 440, 460, generating raw sensor data such as described above.

At block 1024, the network device associates second sensor information corresponding to the second raw sensor data generated at block 1020 with second time information as measured by the second clock. For example, the second sensor (e.g., the sensors 188, 432, 336, 440, 460, etc.) associates the second sensor information with second time information as measured by the second clock (e.g., the clock 148), according to an embodiment. As another example, a DCA associated with the re-timer/gearbox (e.g., the DCA 194) associates the second sensor information with second time information as measured by the second clock (e.g., the clock 148), according to another embodiment.

Associating the second sensor information with the second time information at block 1024 includes associating a sample of raw sensor data measured by the second sensor with a timestamp generated using the second clock, in an embodiment. Associating the second sensor information with the second time information at block 1024 includes associating filtered raw sensor data with a timestamp generated using the second clock, in another embodiment. Associating the second sensor information with the second time information at block 1024 includes associating a plurality of raw sensor data values taken during a time interval measured by the second clock with timing information that indicates the time interval, in another embodiment. Associating the second sensor information with the first time information at block 1024 includes associating filtered raw sensor data generated using raw sensor data generated during a time interval measured by the second clock with timing information that indicates the time interval, in another embodiment.

Associating the second sensor information with the second time information at block 1024 includes associating a performance metric generated using raw sensor data corresponding to a particular time measured by the second clock with a timestamp that indicates the particular time, in another embodiment. Associating the second sensor information with the second time information at block 1024 includes associating a performance metric generated using raw sensor data corresponding to a particular time interval measured by the second clock with timing information that indicates the particular time interval, in another embodiment.

Associating the second sensor information with the second time information at block 1024 includes generating a data structure that associates the second sensor information with the second time information, in some embodiments.

At block 1028, an error detector corresponding to the network switch generates raw error detection data. Generating raw error detection data at block 1028 includes a suitable error detector, such as the error detectors 164, 244, 260, 264, generating raw error detection data such as described above.

At block 1032, the network device associates error detection information corresponding to the raw error detection data generated at block 1028 with third time information as measured by the third clock. For example, the error detector (e.g., the error detectors 164, 244, 260, 264, etc.) associates the error detection information with third time information as measured by the third clock (e.g., the clock 140), according to an embodiment. As another example, a DCA of the network device (e.g., the DCA 168) associates the error detection information with third time information as measured by the third clock (e.g., the clock 140), according to another embodiment.

Associating the error detection information with the third time information at block 1032 includes associating a sample of raw error detection data measured by the error detector with a timestamp generated using the third clock, in an embodiment. Associating the error detection information with the third time information at block 1032 includes associating filtered raw error detection data with a timestamp generated using the third clock, in another embodiment. Associating the error detection information with the third time information at block 1032 includes associating a plurality of raw error detection data values taken during a time interval measured by the third clock with timing information that indicates the time interval, in another embodiment. Associating the error detection information with the third time information at block 1032 includes associating filtered raw error detection data generated using raw error detection data generated during a time interval measured by the third clock with timing information that indicates the time interval, in another embodiment.

Associating the error detection information with the third time information at block 1032 includes associating a performance metric generated using raw error detection data corresponding to a particular time measured by the third clock with a timestamp that indicates the particular time, in another embodiment. Associating the error detection information with the third time information at block 1032 includes associating a performance metric generated using raw error detection data corresponding to a particular time interval measured by the third clock with timing information that indicates the particular time interval, in another embodiment.

Associating the error detection information with the third time information at block 1032 includes generating a data structure that associates the error detection information with the third time information, in some embodiments.

At block 1036, the network device provides to a host processor (e.g., the host processor 196 or another suitable host processor) i) the first sensor information, and ii) the first time information that is associated with the first sensor information. In an embodiment, a DCA (e.g., the DCA 184) provides to the host processor i) the first sensor information, and ii) the first time information that is associated with the first sensor information.

At block 1040, the network device provides to the host processor (e.g., the host processor 196 or another suitable host processor) i) the second sensor information, and ii) the second time information that is associated with the second sensor information. In an embodiment, a DCA (e.g., the DCA 194) provides to the host processor i) the second sensor information, and ii) the second time information that is associated with the second sensor information.

At block 1044, the network device provides to the host processor (e.g., the host processor 196 or another suitable host processor) i) the error detection information, and iv) the third time information that is associated with the error detection information. In an embodiment, a DCA (e.g., the DCA 168) provides to the host processor iii) the error detection information, and iv) the third time information that is associated with the error detection information.

Because the first clock, the second clock, and the third clock are synchronized to the time (e.g., a global time) maintained by the other clock of the other network device in the communication network (blocks 1004, 1008, and 1012), the first time information, the second time information, and the third time information facilitate the host processor correlating, according to the time maintained by the other clock, the first sensor information, the second sensor information, and the error detection information with each other. Additionally or alternatively, because the first clock, the second clock, and the third clock are synchronized to the time (e.g., a global time) maintained by the other clock of the other network device in the communication network (blocks 1004, 1008, and 1012), the first time information, the second time information, and the third time information facilitate the host processor correlating, according to the time maintained by the other clock, the first sensor information, the second sensor information, and the error detection information with other sensor information and/or other error detection information generated by one or more other network devices that perform other instances of the method 1000 and/or perform the method 900 (FIG. 9) or another similar method.

In some embodiments, the method 1000 further includes generating one or more data structures that i) associate the sensor information with the first time information, and ii) associate the error detection information with the second time information; and performing blocks 1036, 1040, and/or 1044 includes providing the one or more data structures to the host processor. In some embodiments, the one or more data structures have a structure the same as or similar to one or more of the data structures illustrated in FIGS. 5A-C and FIGS. 7A-B. In other embodiments, the one or more data structures have another suitable structure different than the data structures illustrated in FIGS. 5A-C and FIGS. 7A-B. In some embodiments, the one or more data structures include information the same as or similar to information included in one or more of the data structures illustrated in FIGS. 5A-C and FIGS. 7A-B. In some embodiments, the one or more data structures omit information included in one or more of the data structures illustrated in FIGS. 5A-C and FIGS. 7A-B and/or include other information not included in one or more of the data structures illustrated in FIGS. 5A-C and FIGS. 7A-B.

In some embodiments in which multiple first sensors correspond to the one or more transceivers, blocks 1012 and 1016 are repeated for each of multiple first sensors.

In some embodiments in which multiple second sensors correspond to the re-timer/gearbox, blocks 1020 and 1024 are repeated for each of multiple first sensors.

In some embodiments in which the network switch includes multiple error detection circuitry, blocks 1028 and 1032 are repeated for each of multiple error detection circuitry.

In some embodiments in which additional error detection circuitry corresponds to the one or more transceivers, the method 1000 further comprises blocks similar to blocks 1028, 1032, and 1044 implemented in conjunction with i) the additional error detection circuitry corresponding to the one or more transceivers, and ii) the first clock.

In some embodiments in which additional error detection circuitry corresponds to the re-timer/gearbox, the method 1000 further comprises blocks similar to blocks 1028, 1032, and 1044 implemented in conjunction with i) the additional error detection circuitry corresponding to the re-timer/gearbox, and ii) the second clock.

In some embodiments in which network switch includes one or more additional sensors, the method 1000 further comprises blocks similar to blocks 1012, 1016, and 1036 implemented in conjunction with i) the additional one or more sensors of the network switch, and ii) the third clock.

In some embodiments, blocks 1004, 1012, 1016, and 1036 are omitted.

In some embodiments, blocks 1008, 1020, 1024, and 1040 are omitted.

In some embodiments, blocks 1010, 1028, 1032, and 1044 are omitted.

At least some of the various blocks, operations, and techniques described above are suitably implemented utilizing dedicated hardware, such as one or more of discrete components, an integrated circuit, an ASIC, a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as in a random access memory (RAM), a read-only memory (ROM), a solid state memory, etc. The software or firmware instructions may include machine readable instructions that, when executed by one or more processors, cause the one or more processors to perform various acts described herein.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for collecting sensor data and error detection data in a network device, the method comprising:
   synchronizing a first clock associated with one or more transceivers of the network device with a global time of a communication network that includes the network device, wherein the global time is maintained externally to the network device;
   synchronizing a second clock associated with a network switch of the network device with the global time, wherein the network switch is communicatively coupled to the one or more transceivers and is configured to process packets received by the one or more transceivers;
   generating, with a sensor corresponding to the one or more transceivers, raw sensor data that measures a characteristic of at least one of i) an integrated circuit (IC) chip corresponding to the one or more transceivers, and ii) an electrical or optical signal corresponding to the one or more transceivers;
   associating, by the network device, sensor information corresponding to the raw sensor data with first time information measured by the first clock;
   generating, with an error detector corresponding to the network switch, raw error detection data corresponding to one or more packets received by the network switch via the one or more transceivers;
   associating, by network device, error detection information corresponding to the raw error detection data with second time information measured by the second clock;
   providing to a host processor, by first data collection circuitry corresponding to the one or more transceivers, i) the sensor information and ii) the first time information measured by the first clock; and
   providing to the host processor, by second data collection circuitry of the network switch, i) the error detection information and ii) the second time information measured by the second clock, wherein the first time information synchronized with the global time and the second time information synchronized with the global time are configured to facilitate the host processor correlating the sensor information and the error detection information according to the global time of the communication network.

2. The method of claim 1, further comprising:
   generating, by the first data collection circuitry, the sensor information to include an indication of an event that corresponds to the raw sensor data;
   wherein associating the sensor information with the first time information comprises associating the indication of the event with first time information that indicates timing of the event as measured by the first clock; and
   wherein providing to the host processor i) the sensor information and ii) the first time information measured by the first clock comprises providing to the host processor i) the indication of the event, and ii) the first time information that indicates the timing of the event as measured by the first clock.

3. The method of claim 2, wherein:
   wherein associating the indication of the event with first time information comprises associating the indication of the event with a timestamp that indicates a time at which the event occurred as measured by the first clock; and
   wherein providing to the host processor i) the indication of the event and ii) the first time information that indicates the timing of the event comprises providing to the host processor i) the indication of the event and ii) the timestamp that indicates the time at which the event occurred as measured by the first clock.

4. The method of claim 1, further comprising:
   generating, by the first data collection circuitry, the sensor information to include one or more samples of the raw sensor data;
   wherein associating the sensor information with the first time information comprises associating the one or more samples of the raw sensor data with first time information that indicates timing of the one or more samples as measured by the first clock; and
   wherein providing to the host processor i) the sensor information and ii) the first time information measured by the first clock comprises providing to the host processor i) the one or more samples, and ii) the first time information that indicates the timing of the one or more samples as measured by the first clock.

5. The method of claim 4, wherein:
   wherein associating the one or more samples of the raw sensor data with the first time information comprises associating the one or more samples of the raw sensor data with a time interval, as measured by the first clock, that corresponds to the one or more samples; and
   wherein providing to the host processor i) the one or more samples, and ii) the first time information comprises providing to the host processor i) the one or more samples and ii) an indication of the time interval, as measured by the first clock, that corresponds to the one or more samples.

6. The method of claim 1, further comprising:
   generating, by the second data collection circuitry, the error detection information to include an indication of an event that corresponds to the raw error detection data;
   wherein associating the error detection information with the second time information comprises associating the indication of the event with second time information that indicates timing of the event as measured by the second clock; and
   wherein providing to the host processor i) the error detection information and ii) the second time information measured by the second clock comprises providing to the host processor i) the indication of the event, and ii) the second time information that indicates the timing of the event as measured by the second clock.

7. The method of claim 6, wherein:
   wherein associating the indication of the event with second time information comprises associating the indication of the event with a timestamp that indicates a time at which the event occurred as measured by the second clock; and
   wherein providing to the host processor i) the indication of the event and ii) the second time information that indicates the timing of the event comprises providing to the host processor i) the indication of the event and ii) the timestamp that indicates the time at which the event occurred as measured by the second clock.

8. The method of claim 1, further comprising:
generating, by the first data collection circuitry, the error detection information to include one or more samples of the raw error detection data;
wherein associating the error detection information with the second time information comprises associating the one or more samples of the raw error detection data with second time information that indicates timing of the one or more samples as measured by the second clock; and
wherein providing to the host processor i) the error detection information and ii) the second time information measured by the second clock comprises providing to the host processor i) the one or more samples, and ii) the second time information that indicates the timing of the one or more samples as measured by the second clock.

9. The method of claim 8, wherein:
wherein associating the one or more samples of the raw error detection data with the second time information comprises associating the one or more samples of the raw error detection data with a time interval, as measured by the second clock, that corresponds to the one or more samples; and
wherein providing to the host processor i) the one or more samples, and ii) the second time information comprises providing to the host processor i) the one or more samples and ii) an indication of the time interval, as measured by the second clock, that corresponds to the one or more samples.

10. The method of claim 1, wherein:
synchronizing the first clock associated with the one or more transceivers of the network device with the global time comprises synchronizing the first clock with the second clock associated with the network switch of the network device after synchronizing the second clock with the global time.

11. The method of claim 1, wherein synchronizing the second clock associated with the network switch of the network device with the global time comprises:
synchronizing the second clock with the global time according to the precision time protocol (PTP).

12. The method of claim 11, wherein synchronizing the second clock with the global time according to the PTP comprises:
synchronizing the second clock with the global time according to the Institute for Electrical and Electronics Engineers (IEEE) 802.1AS Standard.

13. The method of claim 1, wherein the sensor corresponding to the one or more transceivers is a first sensor, the raw sensor data is first raw sensor data, the sensor information corresponding to the raw sensor data is first sensor information, and the method further comprises:
synchronizing a third clock associated with re-timer and/or gearbox circuitry of the network device with the global time, the re-timer and/or gearbox circuitry communicatively coupled to the one or more transceivers and the network switch;
generating, with a second sensor corresponding to the re-timer and/or gearbox circuitry, second raw sensor data that measures a characteristic of at least one of i) an IC chip corresponding to the re-timer and/or gearbox circuitry, and ii) an electrical or optical signal corresponding to the re-timer and/or gearbox circuitry;
associating, by the network device, second sensor information corresponding to the second raw sensor data with third time information measured by the third clock;
providing to the host processor, by third data collection circuitry corresponding to the re-timer and/or gearbox circuitry, i) the second sensor information and ii) the third time information measured by the third clock, wherein the first time information synchronized with the global time, the second time information synchronized with the global time, and the third time information synchronized with the global time are configured to facilitate the host processor correlating the first sensor information, the second sensor information, and the error detection information according to the global time of the communication network.

14. A network device, comprising:
a physical layer (PHY) processor including:
one or more transceivers configured to couple to respective network links external to the network device,
a first clock configured to synchronize with a global time of a communication network that includes the network device, wherein the global time is maintained externally to the network device,
a sensor configured to generate raw sensor data that measures a characteristic of at least one of i) an integrated circuit (IC) chip corresponding to the PHY processor, and ii) an electrical or optical signal corresponding to the PHY processor, and
first data collection circuitry that is configured to provide to a host processor, i) sensor information corresponding to raw sensor data generated by the sensor, and ii) first time information measured by the first clock, the first time information associated with the sensor information; and
a network switch coupled to the PHY processor, the network switch configured to analyze at least headers of packets received by the network switch via network links external to the network device, and to determine network links via which the packets are to be forwarded, the network switch including:
a second clock configured to synchronize with the global time,
error detector circuitry configured to generate raw error detection data corresponding to packets processed by the network switch, and
second data collection circuitry that is configured to provide to the host processor, i) error detection information corresponding to the raw error detection data generated by the error detection circuitry, and ii) second time information measured by the second clock, the second time information associated with the error detection information;
wherein the first time information synchronized with the global time and the second time information synchronized with the global time are configured to facilitate the host processor correlating the sensor information and the error detection information according to the global time of the communication network.

15. The network device of claim 14, wherein the first data collection circuitry is configured to:
generate the sensor information to include an indication of an event that corresponds to the raw sensor data; and
provide to the host processor i) the indication of the event, and ii) first time information that indicates the timing of the event as measured by the first clock.

16. The network device of claim 15, wherein the first data collection circuitry is configured to:
provide to the host processor i) the indication of the event and ii) a timestamp that indicates a time at which the event occurred as measured by the first clock.

17. The network device of claim 14, wherein the first data collection circuitry is configured to:
generate the sensor information to include one or more samples of the raw sensor data; and
provide to the host processor i) the one or more samples, and ii) first time information that indicates a timing of the one or more samples as measured by the first clock.

18. The network device of claim 17, wherein the first data collection circuitry is configured to:
provide to the host processor i) the one or more samples and ii) an indication of a time interval, as measured by the first clock, that corresponds to the one or more samples.

19. The network device of claim 14, wherein the second data collection circuitry is configured to:
generate the error detection information to include an indication of an event that corresponds to the raw error detection data; and
provide to the host processor i) the indication of the event, and ii) second time information that indicates a timing of the event as measured by the second clock.

20. The network device of claim 19, wherein the second data collection circuitry is configured to:
provide to the host processor i) the indication of the event and ii) a timestamp that indicates a time at which the event occurred as measured by the second clock.

21. The network device of claim 14, wherein the second data collection circuitry is configured to:
generate the error detection information to include one or more samples of the raw error detection data; and
provide to the host processor i) the one or more samples, and ii) second time information that indicates a timing of the one or more samples as measured by the second clock.

22. The network device of claim 21, wherein the second data collection circuitry is configured to:
provide to the host processor i) the one or more samples and ii) an indication of a time interval, as measured by the second clock, that corresponds to the one or more samples.

23. The network device of claim 14, wherein:
the first clock includes first clock synchronization circuitry configured to synchronize the first clock to the second clock; and
the second clock includes second clock synchronization circuitry configured to synchronize the second clock to the global time.

24. The network device of claim 14, wherein the second clock includes clock synchronization circuitry configured to:
synchronize the second clock with the global time according to the precision time protocol (PTP).

25. The network device of claim 24, wherein the clock synchronization circuitry is configured to:
synchronize the second clock with the global time according to the Institute for Electrical and Electronics Engineers (IEEE) 802.1AS Standard.

26. The network device of claim 14, wherein the sensor of the PHY processor is a first sensor, the raw sensor data is first raw sensor data, the sensor information corresponding to the raw sensor data is first sensor information, and the network device further comprises:
re-timer and/or gearbox circuitry including:
circuitry configured to at least one of i) receive signals, extract data from the signals, regenerate the signals using the extracted data, and retransmit the regenerated signals, and ii) receive a first signal via a first number of lanes, extract data from the first signal, generate a second signal using the extracted data, the second signal configured for transmission via a second number of lanes, and transmit the second signal via the second number of lanes,
a third clock configured to synchronize with the global time of the communication network that includes the network device,
a second sensor configured to generate second raw sensor data that measures a characteristic of at least one of i) an IC chip corresponding to the re-timer and/or gearbox circuitry, and ii) an electrical or optical signal corresponding to the re-timer and/or gearbox circuitry, and
third data collection circuitry that is configured to provide to the host processor, i) second sensor information corresponding to second raw sensor data generated by the second sensor, and ii) third time information measured by the third clock, the third time information associated with the second sensor information, wherein the first time information synchronized with the global time, the second time information synchronized with the global time, and the third time information synchronized with the global time are configured to facilitate the host processor correlating the first sensor information, the second sensor information, and the error detection information according to the global time of the communication network.

* * * * *